(12) United States Patent
Park et al.

(10) Patent No.: US 12,093,082 B2
(45) Date of Patent: Sep. 17, 2024

(54) SUBSTRATE FOR DISPLAY

(71) Applicant: LG INNOTEK CO., LTD., Seoul (KR)

(72) Inventors: Duck Hoon Park, Seoul (KR); Hae Sik Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 378 days.

(21) Appl. No.: 17/606,515

(22) PCT Filed: Apr. 16, 2020

(86) PCT No.: PCT/KR2020/005078
§ 371 (c)(1),
(2) Date: Oct. 26, 2021

(87) PCT Pub. No.: WO2020/222445
PCT Pub. Date: Nov. 5, 2020

(65) Prior Publication Data
US 2022/0206537 A1 Jun. 30, 2022

(30) Foreign Application Priority Data

Apr. 29, 2019 (KR) .................. 10-2019-0049679
Apr. 29, 2019 (KR) .................. 10-2019-0049687

(51) Int. Cl.
*G06F 1/16* (2006.01)
*H04M 1/02* (2006.01)
*G06F 3/041* (2006.01)

(52) U.S. Cl.
CPC .......... *G06F 1/1652* (2013.01); *G06F 1/1641* (2013.01); *H04M 1/0214* (2013.01);
(Continued)

(58) Field of Classification Search
CPC ................. G06F 1/1641; G06F 1/1652; G06F 2203/04102; G06F 2203/04103;
(Continued)

(56) References Cited

U.S. PATENT DOCUMENTS 9,983,424 B2  5/2018  Kim et al.
10,020,462 B1 * 7/2018  Ai ....................... H10K 59/871
(Continued)

FOREIGN PATENT DOCUMENTS

CN   205881905   1/2017
CN   107578707   1/2018
(Continued)

OTHER PUBLICATIONS

Chinese Office Action dated Dec. 12, 2022 issued in Application No. 2020800325647.
(Continued)

*Primary Examiner* — Tan H Trinh
(74) *Attorney, Agent, or Firm* — KED & ASSOCIATES, LLP

(57) ABSTRACT

A substrate for display has one side or the other side thereof folded to face each other, has a first region defined as a folding region and a second area defined as an unfolding region, and has a plurality of first through-holes formed in the first region and a plurality of second through-holes formed in the second area, a second through-hole comprising a 2-1 opening area which opens to the one side, and a 2-2 opening area which opens to the other side, and the size of the 2-1 opening region Of at least one second through-hole being different from the size of the 2-2 opening area thereof.

14 Claims, 12 Drawing Sheets

(52) U.S. Cl.
CPC ......... *H04M 1/0268* (2013.01); *G06F 3/0412* (2013.01); *H04M 2250/22* (2013.01)

(58) Field of Classification Search
CPC ......... G06F 2203/04112; G06F 3/0412; G06F 3/044; G09F 9/301; H04M 1/0214; H04M 1/0268; H04M 2250/22; F16C 11/04
USPC ..................................................... 455/566
See application file for complete search history.

(56) References Cited

U.S. PATENT DOCUMENTS

| | | | |
|---|---|---|---|
| 10,164,208 B2 | 12/2018 | Lee et al. | |
| 10,381,581 B2 | 8/2019 | Jeong et al. | |
| 10,424,749 B2 | 9/2019 | Kim | |
| 10,608,206 B2 | 3/2020 | Peng et al. | |
| 10,609,829 B2 | 3/2020 | Kim et al. | |
| 11,049,423 B1 * | 6/2021 | Wang | G06F 1/1652 |
| 2016/0357052 A1 | 12/2016 | Kim et al. | |
| 2018/0097197 A1 * | 4/2018 | Han | H05K 5/03 |
| 2018/0102496 A1 | 4/2018 | Kim et al. | |
| 2018/0150108 A1 | 5/2018 | Song | |
| 2018/0190936 A1 | 7/2018 | Lee et al. | |
| 2018/0343753 A1 | 11/2018 | Kim et al. | |
| 2019/0131575 A1 | 5/2019 | Peng et al. | |
| 2019/0208656 A1 * | 7/2019 | Myeong | H05K 5/0017 |
| 2021/0225209 A1 | 7/2021 | Wang | |
| 2021/0352814 A1 * | 11/2021 | Park | G06F 1/1652 |
| 2022/0050321 A1 * | 2/2022 | Park | H05K 1/118 |

FOREIGN PATENT DOCUMENTS

| | | |
|---|---|---|
| CN | 107976725 | 5/2018 |
| CN | 108268170 | 7/2018 |
| CN | 108922983 | 11/2018 |
| CN | 109377877 | 2/2019 |
| KR | 10-2016-0144912 | 12/2016 |
| KR | 10-2018-0034780 | 4/2018 |
| KR | 10-2018-0079091 | 7/2018 |
| KR | 10-2018-0129007 | 12/2018 |
| KR | 10-2018-0131260 | 12/2018 |

OTHER PUBLICATIONS

International Search Report dated Jul. 27, 2020 issued in Application No. PCT/KR2020/005078.

* cited by examiner

【FIG. 1】
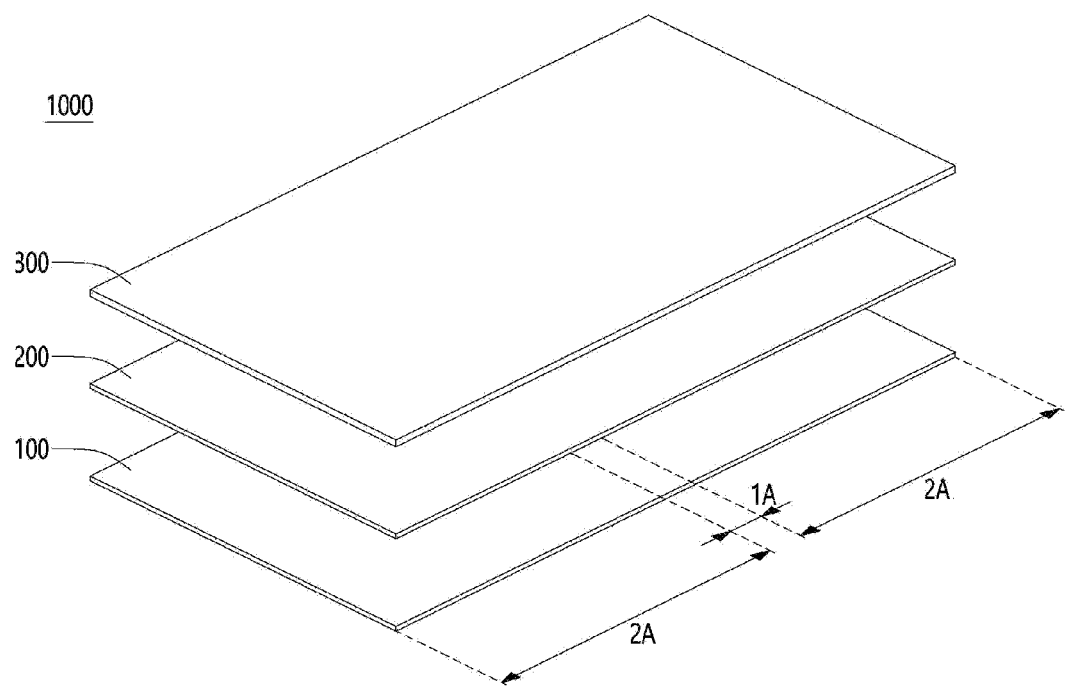
【FIG. 2】
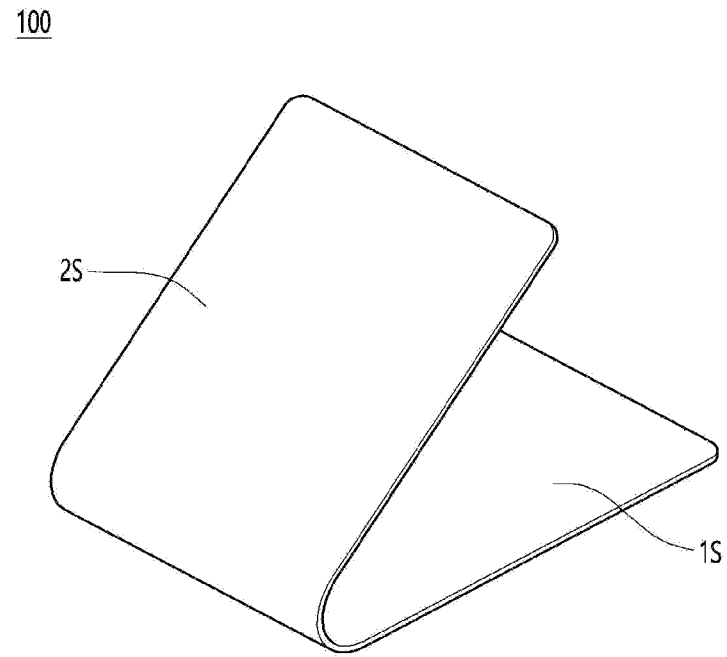

【FIG. 3】
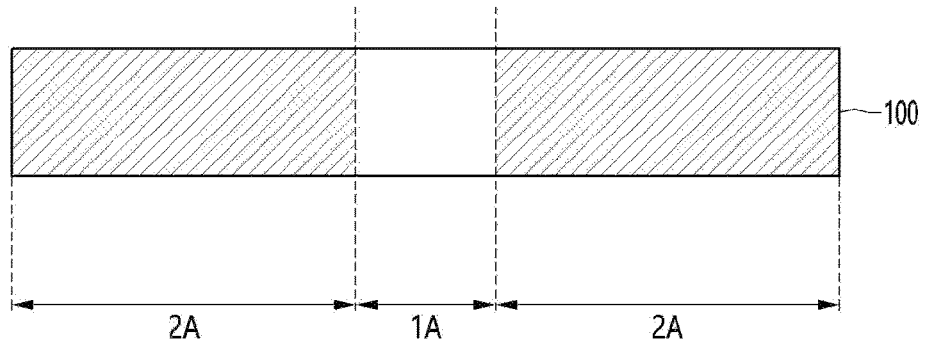
【FIG. 4】
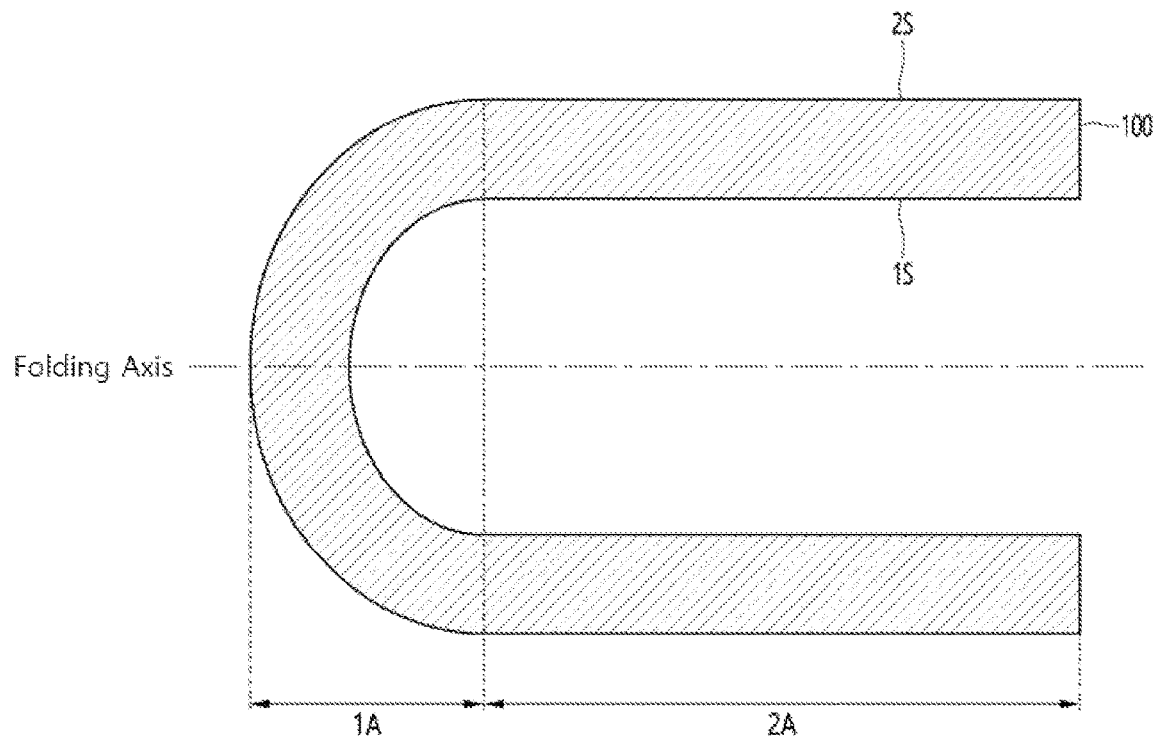

【FIG. 5】
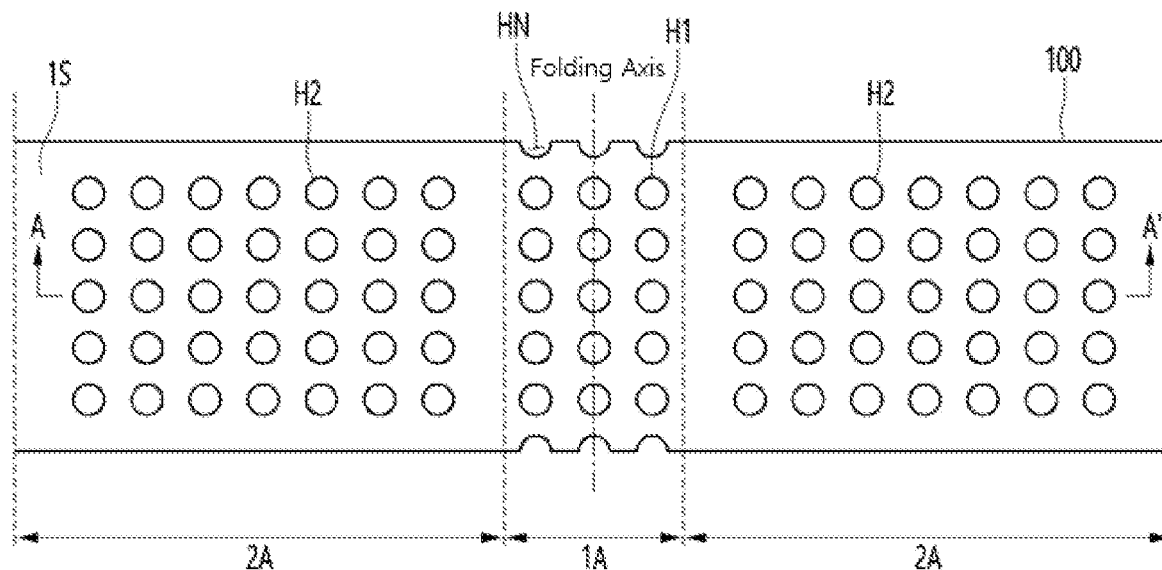
【FIG. 6】
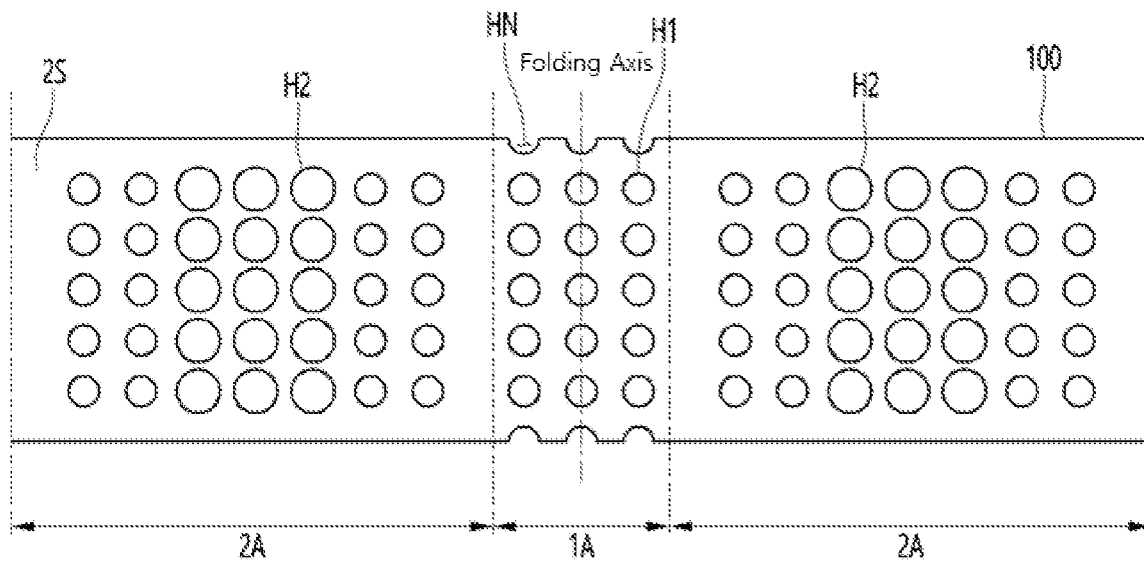

[FIG. 7]
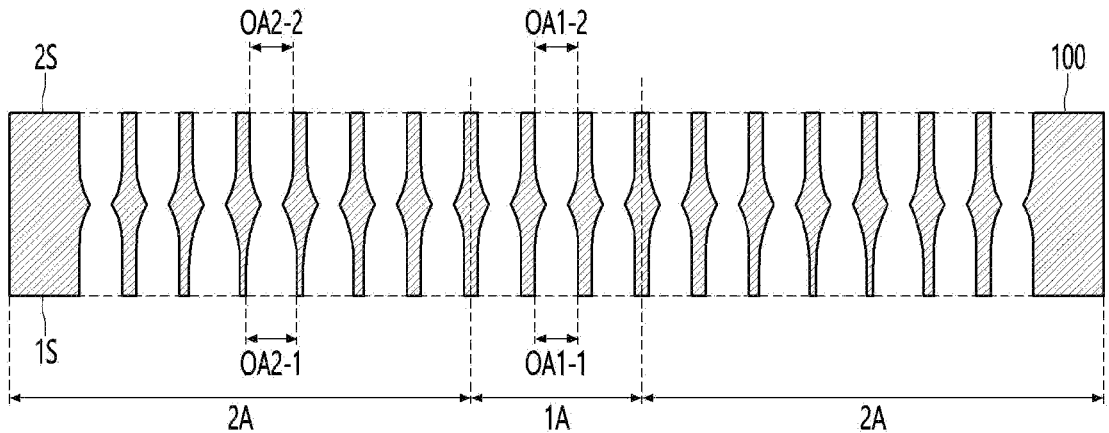
[FIG. 8]
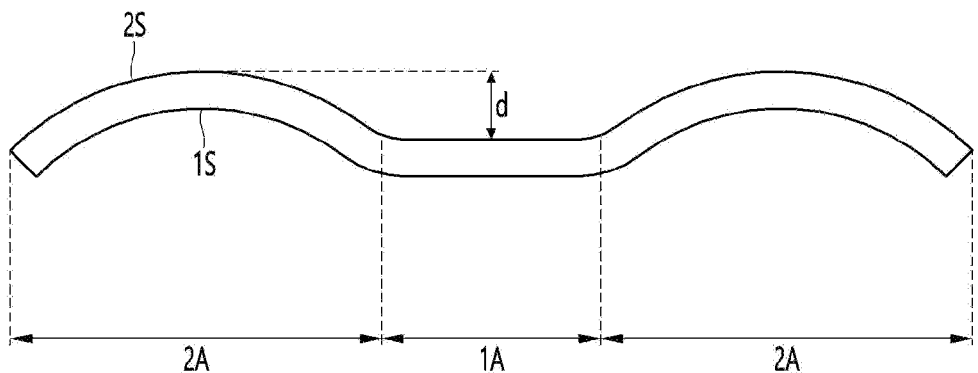
[FIG. 9]
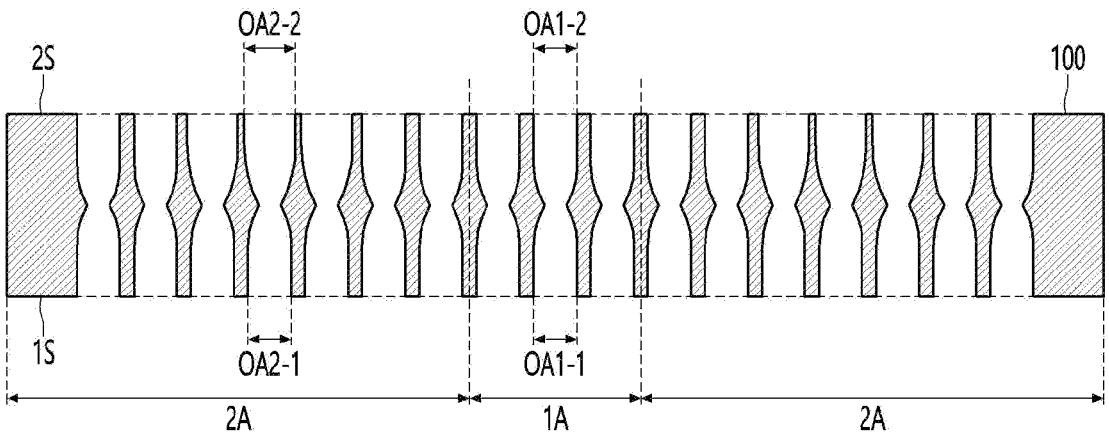

[FIG. 10]
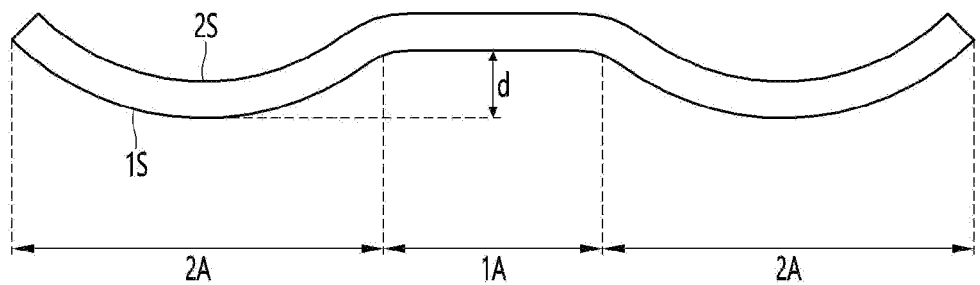
[FIG. 11]
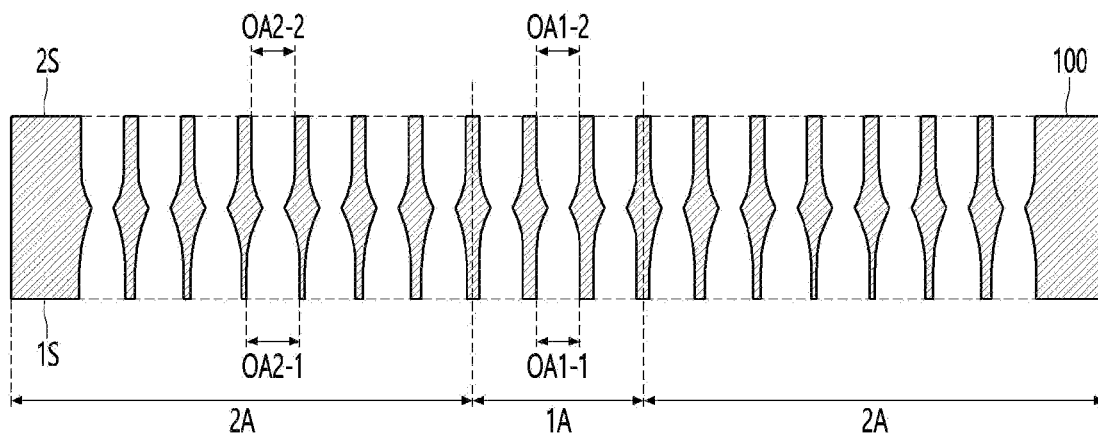
[FIG. 12]
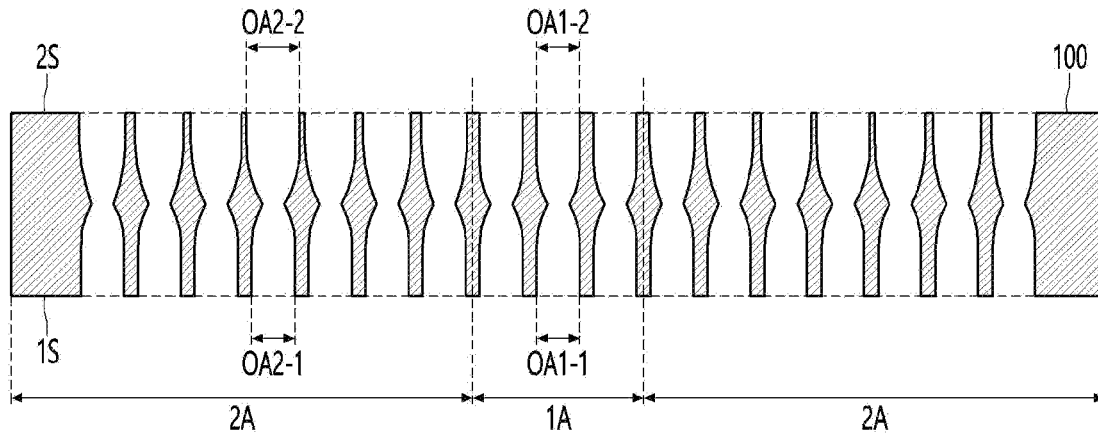

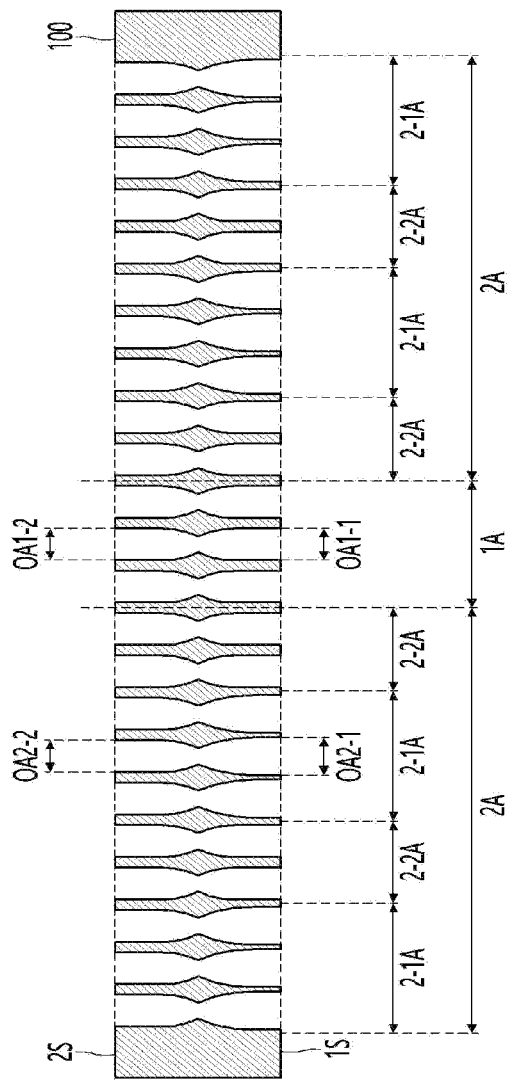
[FIG. 13]

[FIG. 14]
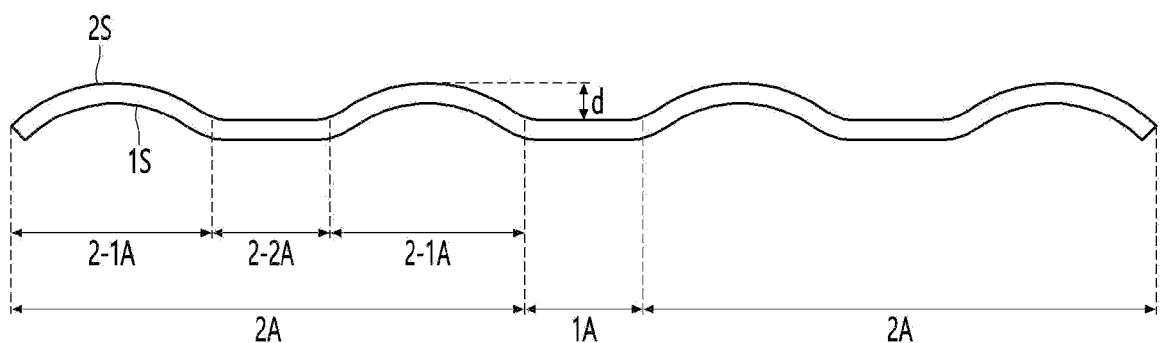

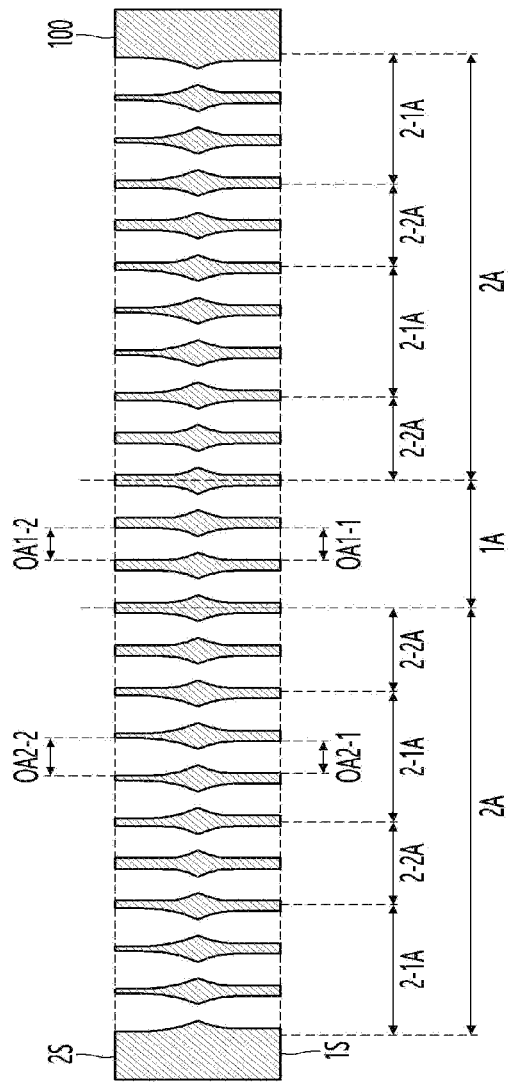
[FIG. 15]

[FIG. 16]
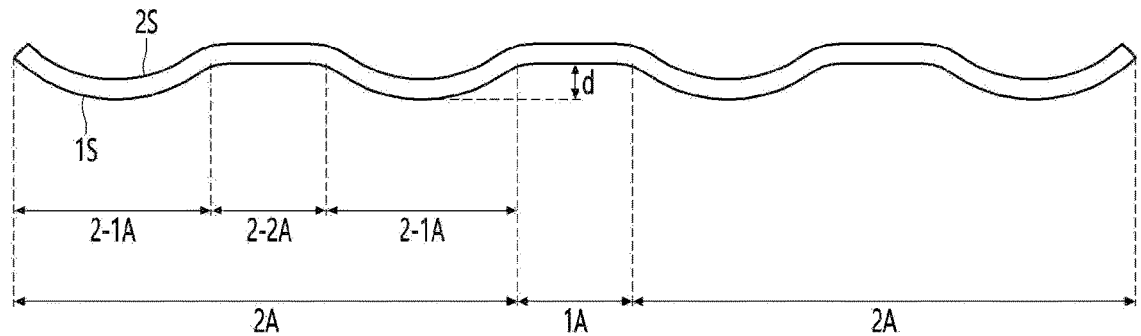
[FIG. 17]
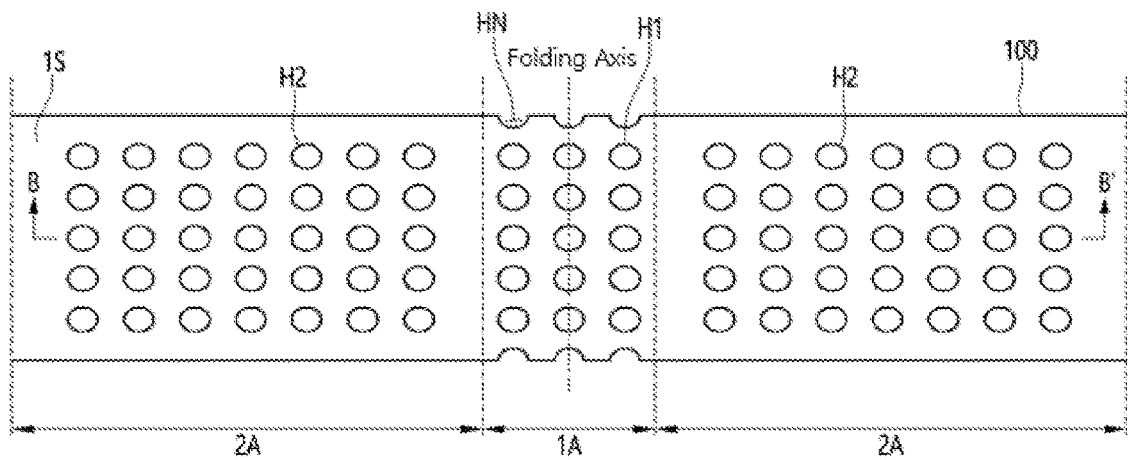
[FIG. 18]
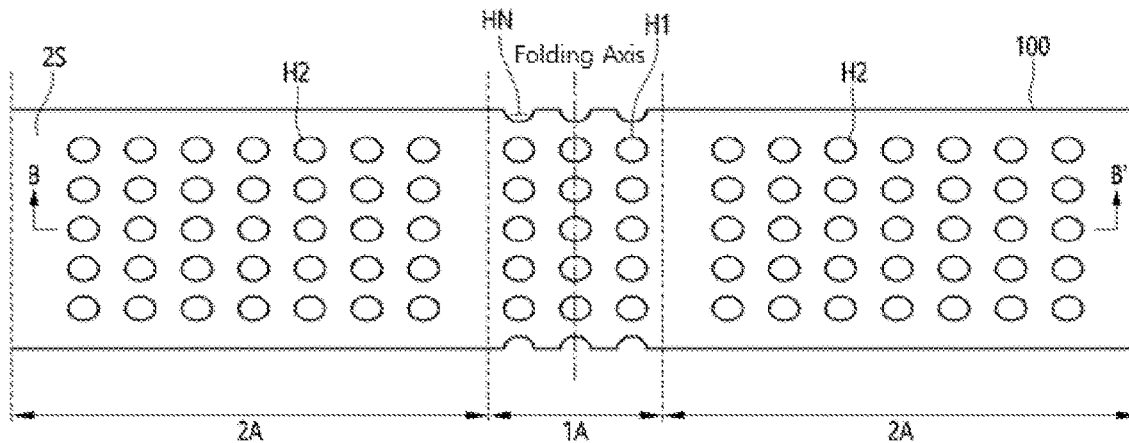

【FIG. 19】
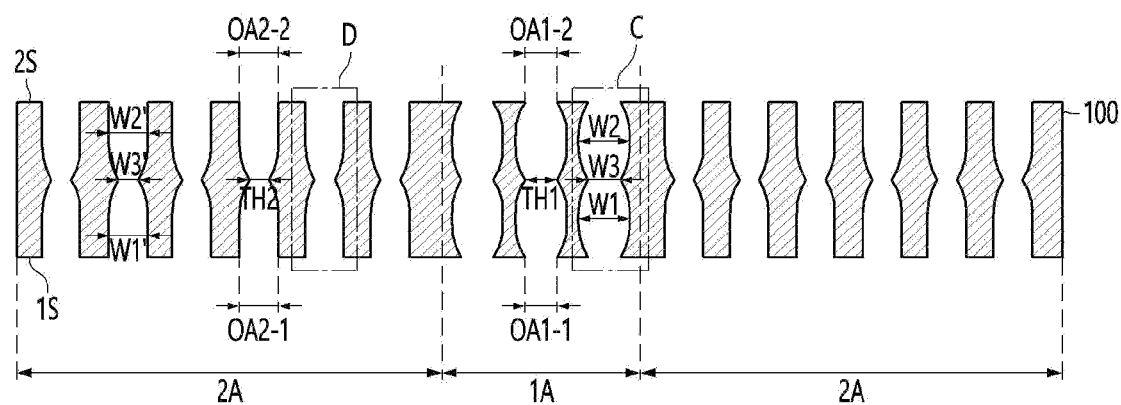
【FIG. 20】
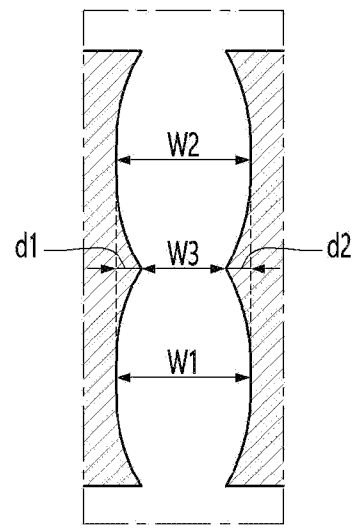

【FIG. 21】
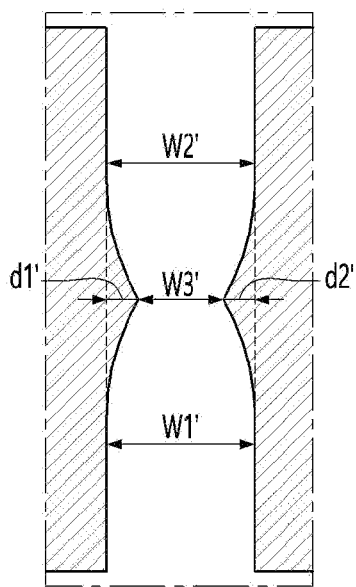
【FIG. 22】
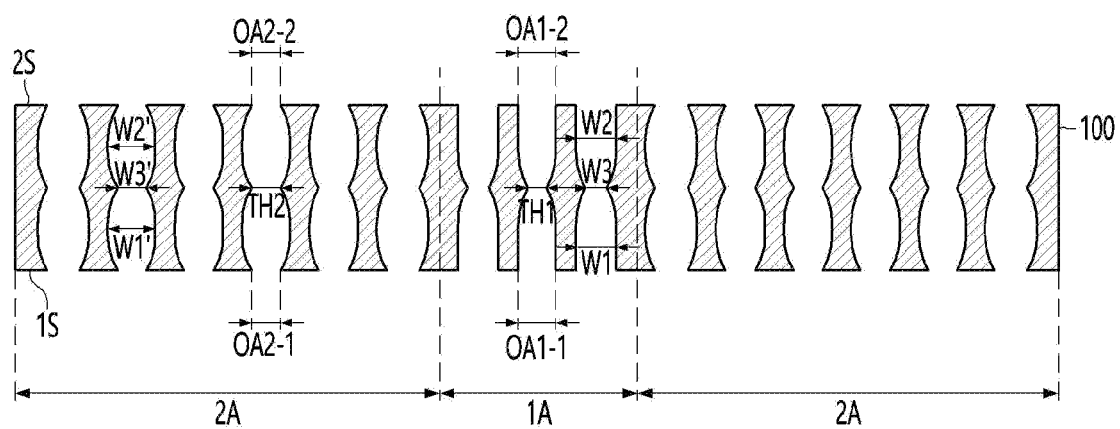

【FIG. 23】
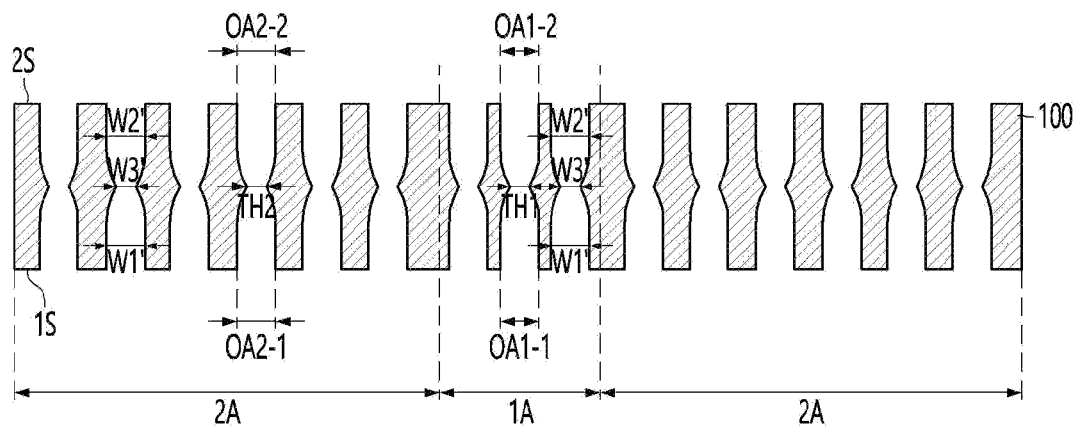
【FIG. 24】
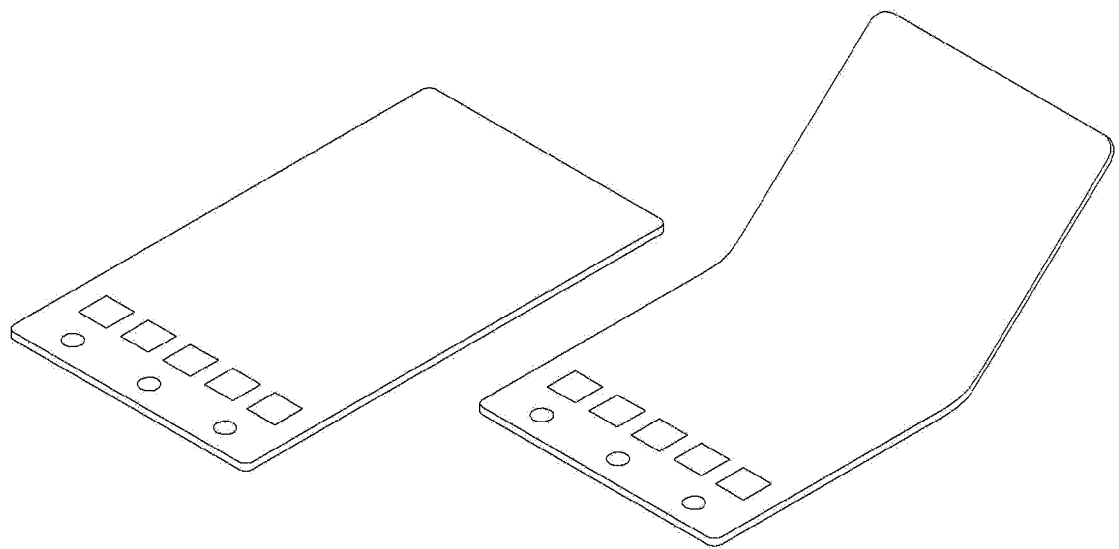

SUBSTRATE FOR DISPLAY

CROSS-REFERENCE TO RELATED PATENT APPLICATIONS

This application is a U.S. National Stage Application under 35 U.S.C. § 371 of PCT Application No. PCT/KR2020/005078, filed Apr. 16, 2020, which claims priority to Korean Patent Application Nos. 10-2019-0049679 and 10-2019-0049687, both filed Apr. 29, 2019, whose entire disclosures are hereby incorporated by reference.

TECHNICAL FIELD

Embodiments relate to a substrate for display.

BACKGROUND ART

Recently, there is an increasing demand for a flexible display device capable of easily carrying various applications and displaying an image on a large screen when being carried.

Such a flexible display is folded or partially bent when being carried or stored, and may be implemented with the display unfolded when displaying images. Accordingly, an image display region may be increased, and a user may easily carry the display.

After the flexible display device is folded or bent, a restoration process of unfolding the flexible display device again may be repeated.

That is, since the flexible display device repeats folding and unfolding operations, the substrate of the flexible display device is required to have a certain strength and elasticity, and cracks and deformations should not occur in the substrate during folding and restoring.

Meanwhile, the substrate for display constituting the flexible display device generally uses a metal substrate. Such a metal substrate is processed by a rolling process during manufacturing, and at this time, an irregular waviness may be formed on a surface of the substrate by the rolling process. Such a waviness increases a surface roughness of the substrate, and a curl phenomenon may occur in one region of the substrate while the folding and unfolding operations are repeated.

In particular, when the curl phenomenon occurs in a folding region of the substrate for display, the folding region is not planarized, and thus folding defects such as cracks occur in the folding region when the substrate is folded, and there is a problem that folding reliability of the flexible display device is deteriorated.

In addition, the substrate for display constituting the flexible display device generally uses a metal substrate. Such a metal substrate may have openings passing through the metal substrate in folding and unfolding portions for dispersion of stress and uniformity due to a heat treatment process.

Such openings may diffuse stress generated in the metal substrate during folding and alleviate a difference in thermal deformation between the folding and unfolding portions that occurs during the heat treatment process, but another problem may occur due to deviations in a size, as an example, a width, and the like of the inside of the opening.

That is, since the width and diameter of the opening are formed differently depending on a position inside the opening, when a through-hole is not formed in the center, deformation such as bending of the metal substrate may occur due to a difference in stress acting on one surface and the other surface of the metal substrate.

Therefore, there is a need for a substrate for display of a new structure capable of minimizing the waviness, the curl phenomenon, and the bending of the folding region in the substrate for display applied to the flexible display device.

DISCLOSURE

Technical Problem

An embodiment is directed to providing a substrate for display having improved folding reliability by planarizing a folding region.

An embodiment is directed to providing a substrate for a display having improved folding reliability by reducing a deviation in size of an inner region of a hole and a through-hole.

Technical Solution

A substrate for display according to an embodiment includes: one surface and the other surface opposite to the one surface; and a first region and a second region, wherein the one surface or the other surface is folded to face each other, the first region is defined as a folding region, and the second region is defined as an unfolding region, a plurality of first through-holes are formed in the first region, and a plurality of second through-holes are formed in the second region, the second through-hole includes a 2-1 opening region in which the one surface is open and a 2-2 opening region in which the other surface is open, and a size of the 2-1 opening region and a size of the 2-2 opening region of at least one of the second through-holes formed in the second region are different.

Advantageous Effects

A substrate for display according to an embodiment can be formed so that a substrate is bent in a direction of one surface or the other surface of the substrate in the entire or partial region of an unfolding region by forming sizes of opening regions in the unfolding region to be different.

Accordingly, since the unfolding region is bent and curled in the direction of the one surface or the other surface of the substrate, the folding region between the unfolding regions can be naturally planarized. That is, a force being pressed against the unfolding region is generated due to a difference in stress in the unfolding region, and the folding region between the unfolding regions can be naturally planarized by such a force generated in the second region.

In addition, a waviness formed in the folding region during a rolling process is also pushed to the unfolding region, and thus the waviness of the folding region is reduced, thereby improving a surface flatness of the first region 1A. That is, a surface roughness of the folding region 1A can be made smaller than that of the unfolding region by reducing the waviness of the folding region.

Therefore, the substrate for display according to the embodiment can prevent the folding region from being curled and improve the surface flatness. Accordingly, it is possible to reduce defects such as cracks in the folding region during folding, thereby improving the reliability of the flexible display device.

In addition, the substrate for display according to the embodiment minimizes a difference in size between a second inner region and a second through-hole in the unfolding region, and accordingly, even though a through-hole is not positioned at a center of a hole, a difference in size between a 2-1 inner region and a 2-2 second region can be minimized.

Accordingly, by minimizing the difference in size between the 2-1 inner region and the 2-2 inner region, a difference in stress acting on the one surface and the other surface of the substrate can also be minimized, and thus it is possible to prevent the curl phenomenon of the substrate from occurring in the unfolding region.

In addition, the substrate for display according to the embodiment minimizes a difference in size between a first inner region and a first through-hole in the folding region, and accordingly, even though a through-hole is not positioned at a center of a hole, a difference in size between a 1-1 inner region and a 1-2 inner region can be minimized.

Accordingly, by minimizing the difference in size between the 1-1 inner region and the 1-2 inner region, the difference in stress acting on the one surface and the other surface of the substrate can also be minimized, and thus it is possible to prevent the curl phenomenon of the substrate from occurring in the unfolding region.

In addition, the substrate for display according to the embodiment minimizes the difference in size between the first inner region and the first through-hole in the folding region and minimizes the difference in size between the second inner region and the second through-hole in the unfolding region, and accordingly, even though a through-hole is not positioned at a center of a hole, the difference in size between the 1-1 inner region and the 1-2th inner region and the difference in size between the 2-1 inner region and the 2-2 inner region can be minimized.

Accordingly, by minimizing the difference in size between the 1-1 inner region and the 1-2 inner region and the difference in size between the 2-1 inner region and the 2-2 inner region, the difference in stress acting on the one surface and the other surface of the substrate can also be minimized, and thus it is possible to prevent the curl phenomenon of the substrate from occurring in the folding region and the unfolding region.

DESCRIPTION OF DRAWINGS

FIG. 1 is a perspective view of a flexible display device according to an embodiment.

FIG. 2 is a perspective view of a substrate for display according to an embodiment.

FIG. 3 is a side view of the substrate for display according to the embodiment before folding.

FIG. 4 is a side view of the substrate for display according to the embodiment after folding.

FIG. 5 is a top view of one surface of the substrate for display according to the embodiment.

FIG. 6 is a top view of the other surface of the substrate for display according to the embodiment.

FIG. 7 is a cross-sectional view taken along line A-A' in FIG. 5.

FIG. 8 is a side view of the substrate for display according to the embodiment.

FIG. 9 is another cross-sectional view taken along line A-A' in FIG. 5.

FIG. 10 is another side view of the substrate for display according to the embodiment.

FIGS. 11 and 12 are still another cross-sectional views taken along line A-A' in FIG. 5.

FIG. 13 is yet another cross-sectional view taken along line A-A' in FIG. 5.

FIG. 14 is still another side view of the substrate for display according to the embodiment.

FIG. 15 is yet another cross-sectional view taken along line A-A' in FIG. 5.

FIG. 16 is yet another side view of the substrate for display according to the embodiment.

FIG. 17 is a top view of one surface of a substrate for display according to another embodiment.

FIG. 18 is a top view of the other surface of the substrate for display according to another embodiment.

FIG. 19 is a cross-sectional view taken along line B-B' in FIG. 17.

FIG. 20 is an enlarged view of region C in FIG. 19.

FIG. 21 is an enlarged view of region D in FIG. 19.

FIG. 22 is a cross-sectional view taken along line B-B' in FIG. 17.

FIG. 23 is a cross-sectional view taken along line B-B' in FIG. 17.

FIG. 24 is a view for describing an example in which a substrate for display according to an embodiment is applied.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (A, and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a substrate for display according to an embodiment will be described with reference to drawings.

FIG. 1 is a perspective view of a flexible display device according to an embodiment.

Referring to FIG. 1, a flexible display device 1000 according to an embodiment may include a substrate 100, a display panel 200 disposed above the substrate 100, and a touch panel 300 disposed on the display panel 200.

The substrate 100 may support the display panel 200 and the touch panel 300. That is, the substrate 100 may be a support substrate supporting the display panel 200 and the touch panel 300.

The substrate 100 may include a material such as metal. For example, the substrate 100 may include metal, metal alloy, plastic, a composite material (e.g., carbon fiber reinforced plastic, a magnetic or conductive material, a glass fiber reinforced material, etc.), ceramic, sapphire, glass, and the like.

The substrate 100 may be flexible. That is, the substrate 100 may be folded or bent in one direction. That is, the substrate 100 may be a substrate for display applied to a flexible display device.

The substrate 100 may include at least two regions. In detail, the substrate 100 may include a first region 1A and a second region 2A.

The first region 1A may be defined as a region in which the substrate 100 is folded. That is, the first region 1A may be a folding region.

In addition, the second region 2A may be defined as a region in which the substrate 100 is not folded. That is, the second region 2A may be an unfolding region.

The first region 1A and the second region 2A will be described in detail below.

The display panel 200 may be disposed above the substrate 100.

The display panel 200 may include a plurality of pixels including a switching thin film transistor, a driving thin film transistor, a power storage device, and an organic light-emitting diode (OLED). In case of the OLED, deposition may be performed at a relatively low temperature, and the OLED may be mainly applied to a flexible display device for reasons such as low power and high luminance. Here, a pixel refers to a minimum unit for displaying an image, and the display panel displays an image through a plurality of pixels.

The display panel may include a substrate, a gate line disposed on the substrate, a data line isolated from the gate line, and a common power line. In general, one pixel may be defined by the gate line, the data line, and the common power line as a boundary.

The substrate may include a material having flexible properties such as a plastic film, and the display panel 200 may be implemented by disposing an organic light-emitting diode and a pixel circuit on a flexible film.

The touch panel 300 may be disposed above the display panel 200. The touch panel 300 may implement a touch function in the flexible display device, and the touch panel may be omitted in a flexible display device that simply displays an image without the touch function.

The touch panel 300 may include a substrate and a touch electrode disposed on the substrate. The touch electrode may sense a position of an input device that is touched on the flexible display device using a capacitance type or a resistive film type.

The substrate of the touch panel 300 may include a material having flexible properties such as a plastic film, and the touch panel 300 may be implemented by disposing the touch electrode on the flexible film.

Meanwhile, the substrate 100 and the display panel 200 may have different sizes.

For example, an area of the substrate 100 may be 90% or more to 110% or less of an area of the display panel 200. In detail, the area of the substrate 100 may be 95% or more to 105% or less of the area of the display panel 200. In more detail, the area of the substrate 100 may be 97% or more to 100% or less of the area of the display panel 200.

When the area of the substrate 100 is 90% or less of the area of the display panel 200, a support force of the substrate 100 to support the display panel 200 or the touch panel 300 decreases, and thus, a curl phenomenon may occur in the unfolding region of the substrate 100. Accordingly, when a user visually recognizes a screen region, visibility may be deteriorated, and when a touch is driven, a screen of a touch region may be incomplete due to a curled region, and thus a touch malfunction may occur.

In addition, when the area of the substrate 100 increases to be 110% or more of the area of the display panel 200, the support force for supporting the display panel or the touch panel may be secured by the substrate 100, but a bezel region of a display device including the substrate, the display panel, and the touch panel may increase. Accordingly, it is impossible to provide a wide effective screen region to the user, which may cause inconvenience in using the display device.

In addition, an area of the first region 1A of the substrate 100 may be 1% or more to 30% or less of an entire area of the substrate 100. In detail, the area of the first region 1A of the substrate 100 may be 5% or more to 20% or less of the entire area of the substrate 100. The area of the first region 1A of the substrate 100 may be 10% or more to 15% or less of the entire area of the substrate 100.

When the area of the first region 1A of the substrate 100 is 1% or less of the entire area of the substrate 100, cracks may occur at the interface of the folding and unfolding regions of the substrate 100 while the folding and restoring of the substrate is repeated, and thus folding reliability of the substrate 100 may be deteriorated.

In addition, when the area of the first region 1A of the substrate 100 exceeds 30% of the entire area of the substrate 100, curl may occur in the folding region of the display panel 200 when the substrate is folded. Accordingly, when the user visually recognizes the screen region, the visibility may be deteriorated, and when the touch is driven, the screen of the touch region may be incomplete due to the curled region, and thus the touch malfunction may occur.

Meanwhile, although not shown in the drawings, a cover window protecting the flexible display device may be additionally disposed above the touch panel 300 or above the display panel 200 (when the touch panel is omitted).

Meanwhile, the substrate 100, the display panel 200, and the touch panel 300 may be adhered to each other through an adhesive layer or the like. In this case, when the substrate 100 and the display panel 200 are adhered, the adhesive layer may not be disposed in the first region, that is, the folding region, of the substrate 100, and the adhesive layer may be disposed in only the second region, that is, the unfolding region to be adhered to each other.

Accordingly, it is possible to easily fold the flexible display device. Therefore, when a surface flatness of the folding region is lowered and a curvature of the folding region, that is, the flatness is increased, the folding region is damaged during folding, and thus the folding reliability may be deteriorated.

The substrate 100 of the flexible display device to be described below has a structure capable of improving the folding reliability of such a substrate.

As described above, the flexible display device includes the substrate 100.

Referring to FIG. 2, the substrate 100 may be bent in one direction.

In detail, the substrate 100 may include one surface 1S and the other surface 2S opposite to the one surface 1S. In the substrate 100, the one surface 1S or the other surface 2S may be bent to face each other.

In the following description, as shown in FIG. 2, it will be mainly described that the substrate 100 is bent in a direction in which the one surfaces 1S face each other.

As described above, the first region 1A and the second region 2A may be defined in the substrate 100. The first region 1A and the second region 2A may be regions defined when the substrate 100 is bent in the direction in which the one surfaces 1S face each other.

In detail, the substrate 100 is bent in one direction, and the substrate 100 may be divided into the first region 1A which is a folded region (folding region) and the second region 2A which is an unfolded region (unfolding region).

Referring to FIG. 3 and FIG. 4, the substrate 100 may include a first region 1A that is a region in which the substrate 100 is bent. The substrate 100 may include a second region 2A that is not bent and is disposed adjacent to the first region 1A.

For example, the second region 2A may be formed on the left side and the right side of the first region 1A based on the direction in which the substrate 100 is bent. That is, the second region 1A may be disposed at both ends of the first region 1A. That is, the first region 1A may be disposed between the second regions 2A.

The first region 1A and the second region 2A may be formed on the same substrate 100. That is, the first region 1A and the second region 2A may be formed integrally with each other without being separated on the same substrate 100.

Sizes of the first region 1A and the second region 2A may be different from each other. In detail, the size of the second region 2A may be larger than the size of the first region 1A.

In the drawings, it is illustrated that the first region 1A is positioned in a central portion of the substrate 100, but the embodiment is not limited thereto. That is, the first region 1A may be positioned in one end and an end region of the substrate 100. That is, the first region 1A may be positioned at one end and the end region of the substrate 100 such that the size of the second region 2A is asymmetric.

FIG. 4 is a side view of the substrate for display after the substrate is folded.

Referring to FIG. 4, the substrate 100 may be folded in one direction around a folding axis. In detail, the one surface 1S may be folded in a direction facing each other along the folding axis.

As the substrate 100 is folded in one direction, the first region 1A and the second region 2A may be formed on the substrate 100. That is, the folding region formed by folding the substrate 100 in one direction and the unfolding region positioned at both ends of the folding region may be formed in the substrate 100.

The folding region may be defined as a region in which a curvature R is formed, and the unfolded region may be defined as a region in which the curvature R is not formed or the curvature is close to zero.

Referring to FIGS. 3 and 4, the substrate 100 may be folded in one direction to be formed in an order of the unfolding region, the folding region, and the unfolding region.

A plurality of holes may be formed in at least one of the first region 1A and the second region 2A to disperse stress generated when the substrate 100 is folded.

The substrate for display according to the embodiment may improve the folding reliability of the substrate for display by controlling a size of the hole formed in the second region 2A, that is, the unfolding region.

Meanwhile, in FIG. 4, it is illustrated that the substrate 100 is folded so that the one surface 1S faces each other, but the embodiment is not limited thereto, and the other surface 2S may be folded to face each other.

For example, in the substrate 100, a folded surface may be varied depending on a size or area of a through-hole formed on the one surface or the other surface of the substrate 100 described below, that is, an opening region That is, the substrate 100 may be folded so that a surface in which the size or area of the through-hole of the substrate 100 described below, that is, the opening region is large faces each other.

That is, the substrate for display described below may be folded in different directions depending on a size of the opening region of the through-hole formed in the substrate 100.

FIGS. 5 and 6 are top views of one surface and the other surface of the substrate for display according to the embodiment. That is, FIG. 5 is a top view of one surface 1S of the substrate, which is a folding inner or outer surface when the substrate 100 is folded, and FIG. 6 is a top view of the other surface 2S of the substrate, which is a folding inner or outer surface when the substrate 100 is folded.

Referring to FIGS. 5 and 6, a plurality of holes passing through the substrate for display 100 may be formed in the substrate for display 100.

A hole may be formed in the first region 1A. In detail, a plurality of first through-holes H1 disposed to be spaced apart from each other may be formed in the first region 1A. The first through-hole H1 may be formed passing through the substrate 100. In detail, the first through-hole H1 may be formed passing through one surface 1S and the other surface 2S of the substrate 100. In FIGS. 5 and 6 illustrate only three holes formed in the first region 1A, but this is for convenience of description, and the first region 1A may be formed with four or more holes, which may be similarly applied to the following cross-sectional views.

The first through-hole H1 may be formed passing through the one surface 1S positioned inside the folding direction and the other surface 2S disposed outside the folding direction.

The plurality of holes formed in the first region 1A serves to disperse stress generated when the first region is folded. In detail, deformation and damage according to the stress may occur in the first region 1A of the substrate due to compressive stress generated when the substrate 100 is folded.

Therefore, it is possible to prevent the stress from being concentrated on a specific region of the first region 1A by forming a hole in the first region 1A. Therefore, it is possible to prevent the substrate from being damaged due to compressive stress generated when the substrate 100 is folded.

The first through-holes H1 may be formed in a regular pattern in the first region 1A. Alternatively, the first through-holes H1 may be formed in an irregular pattern in the first region 1A.

The first through-hole H1 may be formed while having a curved surface. In detail, the first through-hole H1 may be formed in a shape having a curved surface such as an elliptical shape, a hemispherical shape, a circular shape, or the like. For example, the first through-hole H1 may be formed in an elliptical shape having a short width in a length direction of the substrate 100 and a long width in a width direction corresponding to the folding axis of the substrate 100.

However, the embodiment is not limited thereto, and the first through-hole H1 may be formed in a polygonal shape such as a triangle, a square, or the like.

Meanwhile, the first region 1A and the second region 2A may be classified by the presence or absence of a hinge portion. That is, the folding region and the unfolding region may be classified by the presence or absence of the hinge portion.

In detail, a plurality of hinge portions may be formed in the first region 1A, and the hinge portions may not be formed in the second region 2A.

That is, the folding region may be defined as a region in which a hinge portion HN is formed.

The hinge portion HN may be defined as a point at which folding starts in the substrate 100. That is, the substrate may start folding from the hinge portions of both ends among the plurality of hinge portions.

The hinge portion HN may include the plurality of hinge portions according to a folding shape of the substrate 100. The hinge portions HN may be formed at both ends of the substrate 100 overlapping a column direction in which the first through-hole H1 is formed based on a unidirectional length in a width direction of the substrate 100.

Accordingly, when the substrate for display 100 is folded by the hinge portion HN, the folding region may be easily folded.

The hinge portion HN may be formed by passing through one surface and the other surface of a unidirectional region among end regions of the substrate 100. That is, the hinge portion HN may be defined as a hole formed by passing through both end regions in the unidirectional direction among the end regions of the substrate 100.

The hinge portion HN may be disposed at a position overlapping the first through-hole H1. For example, the hinge portion HN may be disposed at a position overlapping the first through-hole H1 in the width direction of the substrate 100. However, the embodiment is not limited thereto, and the hinge portion HN may be disposed at a position that deviates from the first through-hole H1 each other in the width direction of the substrate 100.

A shape of the hinge portion HN may be the same as or different from a shape and size of the first through-hole H1. For example, the hole may be formed to have a curved surface. In detail, the hole may be formed in a shape having a curved surface such as an elliptical shape, a hemispherical shape, or a circular shape.

However, the embodiment is not limited thereto, and of course, the hinge portion may be formed in a polygonal shape such as a triangular shape or a quadrangular shape, or an elliptical shape.

A hole may be formed in the second region 2A. In detail, the hole may be formed in the second region 2A defined as an unfolding region. That is, holes may be formed in the entire region of the substrate for display 100.

A plurality of second through-holes H2 disposed to be spaced apart from each other may be formed in the second region 2A. The second through-hole H2 may be formed passing through the substrate 100. In detail, the second through-hole H2 may be formed passing through one surface 1S and the other surface 2S of the substrate 100.

That is, the second through-hole H2 may be formed passing through the one surface 1S positioned inside the folding direction and the other surface 2S disposed outside the folding direction.

The second through-hole H2 may serve to reduce a difference in deformation caused by heat of the first region 1A in which the first through-hole H1 is formed.

In detail, a difference between the deformation caused by heat in the first region 1A and the deformation caused by heat in the second region 2A may be alleviated by forming holes in both the first region 1A and the second region 2A. Therefore, it is possible to prevent the substrate for display from being bent or warped.

The second through-holes H2 may be formed in a regular pattern in the second region 2A, or alternatively, the second through-holes H2 may be formed in an irregular pattern in the second region 2A.

The second through-hole H2 may be formed while having a curved surface. In detail, the second through-hole H2 may be formed in a shape having a curved surface such as an elliptical shape, a hemispherical shape, or a circular shape, or the like.

However, the embodiment is not limited thereto, and the second through-hole H2 may be formed in a polygonal shape such as a triangle or a square, or the like.

Referring to FIG. 7, the first through-hole H1 and the second through-hole H2 may include an opening region formed as one surface and the other surface of the substrate are open, respectively.

In detail, the first through-hole H1 may include a 1-1 opening region OA1-1 and a 1-2 opening region OA1-2. In addition, the second through-hole H2 may include a 2-1 opening region OA2-1 and a 2-2 opening region OA2-2.

The 1-1 opening region OA1-1 may be a region formed on the one surface 1S of the substrate 100 in the first through-hole H1, and the 1-2 opening region OA1-2 may be a region formed on the other surface 2S of the substrate in the first through-hole H1. That is, the 1-1 opening region OA1-1 and the 1-2 opening region OA1-2 may be defined as surface holes formed on the one surface 1S and the other surface 2S of the substrate.

In addition, the 2-1 opening region OA2-1 is a region formed on the one surface 1S of the substrate in the second through-hole H2, and the 2-2 opening region OA2-2 may be a region formed on the other surface 2S of the substrate in the second through-hole H2. That is, the 2-1 opening region OA2-1 and the 2-2 opening region OA2-2 may be defined as surface holes formed on one surface 1S and the other surface 2S of the substrate.

A size of the 1-1 opening region OA1-1 may correspond to a size of the 1-2 opening region OA1-2. In detail, the size of the 1-1 opening region OA1-1 and the size of the 1-2 opening region OA1-2 may be the same as or similar to each other. Here, the meaning of the same may be defined as including different error ranges during a process. That is, the sizes of the opening regions of the first through-holes H1 may be the same as or similar to each other on the one surface 1S and the other surface 2S of the substrate.

Here, the size of the opening region may be defined as an area of the opening region formed on the one surface and the other surface of the substrate. That is, the size of the opening region formed on the one surface of the substrate may be defined as an area of the opening region passing through the one surface, and the size of the opening region formed on the other surface of the substrate is defined as an area of the opening region passing through the other surface.

That is, the size of the opening region may be defined as surface holes formed on the one surface and the other surface in the first through-hole and the second through-hole passing through the one surface and the other surface as shown in FIGS. 5 and 6.

For example, when the shape of the opening region is a circle, the size of the opening region may be defined as an area of the circle, and when the shape of the opening region is a polygon such as a rectangle or triangle, the size of the opening region may be defined as an area of the polygon.

Meanwhile, the second region 2A may include a variable region in which sizes of opening regions on the one surface and the other surface of the substrate are different. In detail, a size of the 2-1 opening region OA2-1 of the second through-hole H2 formed in the second region 2A may be different from a size of the 2-2 opening region OA2-2.

In detail, the size of the 2-1 opening region OA2-1 may be larger than that of the 2-2 opening region OA2-2. Accordingly, the variable region in which the size of the 2-1 opening region OA2-1 different from that of the 2-2 opening region OA2-2 may be formed in the second region 2A.

In addition, the size of the 2-2 opening region OA2-2 may be smaller than the size of the 1-1 opening region OA1-1 and the size of the 1-2 opening region OA1-2.

In addition, the size of the 2-1 opening region OA2-1 is the same as or similar to the size of the 1-1 opening region OA1-1 and the size of the 1-2 opening region OA1-2.

In the second through-hole H2, a size of an opening region formed on the folding inner surface of the substrate may be larger than a size of an opening region formed on the folding outer surface of the substrate based on a direction in which the substrate is folded.

That is, in the second through-hole H2 formed in the variable region of the second region 2A, the size of the 2-1 opening region OA2-1 formed on the one surface 1S of the substrate may be larger than the size of the 2-2 opening region OA2-2 formed on the other surface 2S of the substrate.

For example, a plurality of second through-holes H may be formed in the second region 2A, and each of the holes may include the 2-1 opening region OA2-1 and the 2-2 opening region OA2-2.

The second region 2A may include a region in which the sizes of the 2-1 opening region OA2-1 and the 2-2 second opening region OA2-2 are different. For example, the variable region in which the sizes of the 2-1 opening region OA2-1 and the 2-2 opening region OA2-2 are different and a fixed region in which the sizes of the 2-1 opening region OA2-1 and the 2-2 opening region OA2-2 are the same or similar may exist in the second region 2A.

In this case, the variable region in which the sizes of the 2-1 opening region OA2-1 and the 2-2 opening region OA2-2 are different may be formed as much as about 40% to 60% of the entire region of view each second region 2A disposed on the left and right sides of the first region 2A.

When the variable region in which the sizes of the 2-1 opening region OA2-1 and the 2-2 opening region OA2-2 are different is less than about 40% of the entire region Of each second region 2A, a magnitude of stress generated in the second region is small, and thus it is not possible to effectively planarize the first region 1A, and when the variable region exceeds about 60%, the magnitude of the stress generated in the second region becomes too large, and thus adhesion failure may occur during adhesion to other panels.

Meanwhile, in the variable region, the size of the 2-1 opening region OA2-1 may be more than 1 times and less than 2 times the size of the 2-2 opening region OA2-2.

That is, the size of the 2-1 opening region OA2-1 may be larger than the size of the 2-2 opening region OA2-2 and may be 2 times or less the size of the 2-2 opening region OA2-2.

When there is no difference between the size of the 2-1 opening region OA2-1 and the size of the 2-2 opening region OA2-2, a difference in stress on the one surface and the other surface of the substrate may not be generated, when the size of the 2-1 opening region OA2-1 exceeds 2 times the size of the 2-2 opening region OA2-2, as the difference in stress increases, the second region may be excessively bent, and thus adhesion failure may occur during adhesion to other panels.

The difference in size between the 2-1 opening region OA2-1 and the 2-2 second opening region OA2-2 may be related to the stress generated in the second region 2A. In detail, as the sizes of the 2-1 opening region OA2-1 and the 2-2 opening region OA2-2 are different from each other, the magnitude of stress applied to the one surface 1S and the other surface 2S of the substrate 100 may be different in the second region 2A of the substrate 100.

That is, in the 2-1 opening region OA2-1 in which the size of the opening region is large in each of the second through-holes, the stress may be generated small due to the dispersion of stress in the 2-1 opening region OA2-1 in which the size of the opening region is large, and the stress may be generated relatively large in the 2-2 opening region OA2-2 in which the size of the opening region is small.

Therefore, since the one surface 1S of the substrate on which the stress acts small tends to contract and the other surface 2S of the substrate on which the stress acts large tends to expand in the variable region, the substrate may be bent in the direction of the other surface 2S of the substrate in the variable region of the second region formed with different sizes of the opening regions.

That is, referring to FIG. 8, in a region in which the size of the 2-1 opening region OA2-1 in the second region 2A is larger than the size of the 2-2 opening region OA2-2, the substrate 100 may be bent in the direction of the other surface 2S of the substrate. That is, the second region 2A may be bent so that the curvature of the second region is greater than the curvature of the first region 1A.

Accordingly, since the second region 2A is bent and curled in the direction of the other surface 2S of the substrate, the first region between the second regions 2A may be naturally planarized. That is, a force being pressed against the second region 2A is generated due to a difference in stress in the second region 2A, and the first region between the second regions 2A may be naturally planarized by such a force generated in the second region.

In detail, referring to FIG. 8, a distance d between the first region 1A and the second region 2A at the maximum height may be about 0.1 mm to about 5 mm. That is, the second region 2A may be formed to be curled by about 0.1 mm to about 5 mm with respect to the first region 1A, and accordingly, the first region 1A may be naturally planarized by the second region 2A.

In addition, a waviness formed in the first region 1A during the rolling process is also pushed to the second region 2A, and thus the waviness of the first region 1A is reduced, thereby improving the surface flatness of the first region 1A.

That is, a surface roughness of the first region 1A may be made smaller than that of the second region 2A by reducing the waviness of the first region 1A.

Therefore, the substrate for display according to the embodiment may prevent the first region, which is the folding region, from being curled and improve the surface flatness. Accordingly, it is possible to reduce defects such as cracks in the folding region during folding, thereby improving the reliability of the flexible display device.

Meanwhile, referring to FIGS. 9 and 10, unlike FIGS. 7 and 8, the size of the opening region formed on the second surface 2S of the substrate 100 may be larger than the size of the opening region formed on the first surface 1S.

Referring to FIG. 9, the size of the 2-1 opening region OA2-1 in the variable region of the second region 2A may be different from the size of the 2-2 opening region OA2-2. In detail, the size of the 2-2 opening region OA2-2 may be larger than the size of the 2-1 opening region OA2-1.

In addition, the size of the 2-1 opening region OA2-1 may be smaller than the size of the 1-1 opening region OA1-1 and the size of the 1-2 opening region OA1-2.

In addition, the size of the 2-2 opening region OA2-2 may be the same as or similar to the size of the 1-1 opening region OA1-1 and the size of the 1-2 opening region OA1-2.

In the second through-hole H2, the size of the opening region formed on the folding outer surface of the substrate may be larger than the size of the opening region formed on the folding inner surface of the substrate based on the direction in which the substrate is folded.

That is, in the second through-hole H2, the size of the 2-2 opening region OA2-2 formed on the other surface 2S of the substrate may be larger than the size of the 2-1 opening region OA2-1 formed on the one surface 1S of the substrate.

For example, the plurality of second through-holes H may be formed in the second region 2A, and each of the holes may include the 2-1 opening region OA2-1 and the 2-2 opening region OA2-2.

The second region 2A may include a region in which the sizes of the 2-1 opening region OA2-1 and the 2-2 second opening region OA2-2 are different. For example, the variable region in which the sizes of the 2-1 opening region OA2-1 and the 2-2 opening region OA2-2 are different and the fixed region in which the sizes of the 2-1 opening region OA2-1 and the 2-2 opening region OA2-2 are the same or similar may exist in the second region 2A.

In this case, the variable region in which the sizes of the 2-1 opening region OA2-1 and the 2-2 opening region OA2-2 are different may be included as much as about 40% to 60% of the entire region of each second region 2A disposed on the left and right sides of the first region 2A.

When the variable region in which the sizes of the 2-1 opening region OA2-1 and the 2-2 opening region OA2-2 are different is less than about 40% of the entire region of each second region 2A, the magnitude of stress generated in the second region is small, and thus it is not possible to effectively planarize the first region 1A, and when the variable region exceeds about 60%, the magnitude of the stress generated in the second region becomes too large, and thus adhesion failure may occur during adhesion to other panels.

The size of the 2-2 opening region OA2-2 may be more than 1 times and less than 2 times the size of the 2-1 opening region OA2-1.

That is, the size of the 2-2 opening region OA2-2 may be larger than the size of the 2-1 opening region OA2-1 and may be 2 times or less the size of the 2-1 opening region OA2-1.

When there is no difference between the size of the 2-1 opening region OA2-1 and the size of the 2-2 opening region OA2-2, a difference in stress on the one surface and the other surface of the substrate may not be generated, when the size of the 2-2 opening region OA2-2 exceeds 2 times the size of the 2-1 opening region OA2-1, as the difference in stress increases, the second region may be excessively bent, and thus adhesion failure may occur during adhesion to other panels.

The difference in size between the 2-1 opening region OA2-1 and the 2-2 second opening region OA2-2 may be related to the stress generated in the second region 2A. In detail, as the sizes of the 2-1 opening region OA2-1 and the 2-2 opening region OA2-2 are different from each other, the magnitude of stress applied to the one surface 1S and the other surface 2S of the substrate 100 may be different in the second region 2A of the substrate 100.

That is, in a region in which the one surface and the other surface of the substrate 100 overlap, the stress may be generated small due to the dispersion of stress in the 2-2 opening region OA2-2 in which the size of the opening region is large, and the stress may be generated relatively large in the 2-1 opening region OA2-1 in which the size of the opening region is small.

Therefore, since the other surface 2S of the substrate on which the stress acts small tends to contract and the one surface 1S of the substrate on which the stress acts large tends to expand, the substrate may be bent in the direction of the one surface 1S of the substrate in the second region formed with different sizes of the opening regions.

That is, referring to FIG. 10, in the variable region in which the size of the 2-2 opening region OA2-2 is larger than the size of the 2-1 opening region OA2-1 in the second region 2A, the substrate 100 may be bent in the direction of the one surface 1S of the substrate.

Accordingly, since the second region 2A is bent and pressed in the direction of the one surface 1S of the substrate, the first region 1A between the second regions 2A may be naturally planarized. That is, a force being pressed against the second region 2A is generated due to a difference in stress in the second region 2A, and the first region 1A between the second regions 2A may be naturally planarized by such a force generated in the second region.

In detail, referring to FIG. 10, a distance d between the first region 1A and the second region 2A at the minimum height may be about 0.1 mm to about 5 mm. That is, the second region 2A may be formed to be pressed against the first region 1A by about 0.1 mm to about 5 mm, and accordingly, the first region 1A may be naturally planarized by the second region 2A.

In addition, the waviness formed in the first region 1A during the rolling process is also pushed to the second region 2A, and thus the waviness of the first region 1A is reduced, thereby improving the surface flatness of the first region 1A.

Therefore, the substrate for display according to the embodiment may prevent the first region, which is the folding region, from being curled and improve the surface flatness. Accordingly, it is possible to reduce defects such as cracks in the folding region during folding, thereby improving the reliability of the flexible display device.

Meanwhile, referring to FIGS. 11 and 12, unlike FIGS. 7 and 8, the size of the 2-1 opening region OA2-1 is larger than the size of the 2-2 opening region OA2-2 and may be formed to be gradually increased or decreased.

Referring to FIGS. 11 and 12, the size of the 2-1 opening region OA2-1 may be different from the size of the 2-2 opening region OA2-2. In detail, referring to FIG. 11, the size of the 2-1 opening region OA2-1 may be larger than the size of the 2-2 opening region OA2-2. In addition, referring to FIG. 12, the size of the 2-2 opening region OA2-2 may be larger than the size of the 2-1 opening region OA2-1.

For example, a plurality of second through-holes H2 may be formed in the second region 2A, and each of the holes may include the 2-1 opening region OA2-1 and the 2-2 opening region OA2-2.

In at least one of the second regions 2A, the sizes of the 2-1 opening region OA2-1 and the 2-2 second opening region OA2-2 may be different from each other. For example, the variable region in which the sizes of the 2-1 opening region OA2-1 and the 2-2 opening region OA2-2 are different and the fixed region in which the sizes of the 2-1 opening region OA2-1 and the 2-2 opening region OA2-2 are the same or similar may exist in the second region 2A.

In this case, the region in which the sizes of the 2-1 opening region OA2-1 and the 2-2 opening region OA2-2 are different may be included as much as about 40% to 60% of the entire region of each second region 2A disposed on the left and right sides of the first region 2A.

When the variable region in which the sizes of the 2-1 opening region OA2-1 and the 2-2 opening region OA2-2 are different is less than about 40% of the entire region of each second region 2A, the magnitude of stress generated in the second region is small, and thus it is not possible to effectively planarize the first region 1A, and when the variable region exceeds about 60%, the magnitude of the stress generated in the second region becomes too large, and thus adhesion failure may occur during adhesion to other panels.

In addition, the size of the 2-1 opening region OA2-1 in the region in which the sizes of the 2-1 opening region OA2-1 and the 2-2 opening region OA2-2 are different may be formed to be gradually decreased or gradually increased.

Referring to FIG. 11, the size of the 2-1 opening region OA2-1 in the region in which the sizes of the 2-1 opening region OA2-1 and the 2-2 opening region OA2-2 are different may be gradually decreased while moving in the direction of the first region 1A.

Alternatively, the size of the 2-1 opening region OA2-1 in the region in which the sizes of the 2-1 opening region OA2-1 and the 2-2 opening region OA2-2 are different may be gradually increased while moving in the direction of the first region 1A.

Alternatively, the size of the 2-1 opening region OA2-1 in the region in which the sizes of the 2-1 opening region OA2-1 and the 2-2 opening region OA2-2 are different may be gradually decreased and then increased or may be increased and then decreased while moving in the direction of the first region 1A.

Alternatively, referring to FIG. 12, the size of the 2-2 opening region OA2-2 in the region in which the sizes of the 2-1 opening region OA2-1 and the 2-2 opening region OA2-2 are different may be gradually decreased while moving in the direction of the first region 1A.

Alternatively, the size of the 2-2 opening region OA2-2 in the region in which the sizes of the 2-1 opening region OA2-1 and the 2-2 opening region OA2-2 are different may be gradually increased while moving in the direction of the first region 1A.

Alternatively, the size of the 2-2 opening region OA2-2 in a region in which the sizes of the 2-1 opening region OA2-1 and the 2-2 opening region OA2-2 are different may be gradually decreased and then increased or may be increased and then decreased while moving in the direction of the first region 1A.

Accordingly, by gradually changing the magnitude of stress generated in the region in which the sizes of the 2-1 opening region OA2-1 and the 2-2 opening region OA2-2 are different, it is possible to prevent cracks or deformation in the second region due to a sudden change in stress.

Meanwhile, referring to FIGS. 13 and 14, the second region 2A may include the region in which the sizes of the 2-1 opening region OA2-1 and the 2-2 opening region OA2-2 are different in plural.

The second region 2A may be defined as two regions according to a difference in size between the 2-1 opening region OA2-1 and the 2-2 opening region OA2-2. In detail, the second region 2A may include a 2-1 region 2-1A in which the sizes of the 2-1 opening region OA2-1 and the 2-2 opening region OA2-2 are different and a 2-2 region 2-2A in which the sizes of the 2-1 opening region OA2-1 and the 2-2 opening region OA2-2 are the same or similar.

In this case, the second region 2A may include at least two or more of the 2-1 region 2-1A in which the sizes of the 2-1 opening region OA2-1 and the 2-2 opening region OA2-2 are different.

In this case, the 2-1 region 2-1A may be included as much as about 40% to 60% of the entire region of each second region 2A disposed on the left and right sides of the first region.

When the 2-1 region 2-1A is less than about 40% of the entire region of each second region 2A, the magnitude of the stress generated in the second region is small, and thus it is not possible to effectively planarize the first region 1A, and when the 2-1 region 2-1A exceeds about 60%, the magnitude of the stress generated in the second region becomes too large, and thus adhesion failure may occur during adhesion to other panels.

The difference in size between the 2-1 opening region OA2-1 and the 2-2 opening region OA2-2 may be related to the stress generated in the second region 2A. In detail, as the sizes of the 2-1 opening region OA2-1 and the 2-2 opening region OA2-2 are different from each other, the magnitude of stress applied to the one surface 1S and the other surface 2S of the substrate 100 may be different in the second region 2A of the substrate 100.

That is, in the region in which the one surface and the other surface of the substrate 100 overlap, the stress may be generated small due to the dispersion of stress in the 2-1 opening region OA2-1 in which the size of the opening region is large, and the stress may be generated relatively large in the 2-2 opening region OA2-2 in which the size of the opening region is small.

Therefore, since the one surface 1S of the substrate on which the stress acts small tends to contract and the other surface 2S of the substrate on which the stress acts large tends to expand, the substrate may be bent in the direction of the other surface 2S of the substrate in the second region formed with different sizes of the opening regions.

Accordingly, referring to FIG. 14, in the second region 2A, the substrate 100 may be bent in the direction of the other surface 2S of the substrate in the 2-1 region 2-1A. That is, at least two or more regions in which the substrate is bent in the direction of the other surface 2S of the substrate may exist in the second region 2A.

Accordingly, since the second region 2A is bent and curled in the direction of the other surface 2S of the substrate, the first region between the second regions 2A may be naturally planarized. That is, a force being pressed against the second region 2A is generated due to a difference in stress in the second region 2A, and the first region between the second regions 2A may be naturally planarized by such a force generated in the second region.

In detail, referring to FIG. 14, the distance d between the first region 1A and the second region 2A at the maximum height may be about 0.1 mm to about 5 mm. That is, the second region 2A may be formed to be curled by about 0.1 mm to about 5 mm with respect to the first region 1A, and accordingly, the first region 1A may be naturally planarized by the second region 2A.

In addition, the waviness formed in the first region 1A during the rolling process is also pushed to the second region 2A, and thus the waviness of the first region 1A is reduced, thereby improving the surface flatness of the first region 1A.

Therefore, the substrate for display according to the embodiment may prevent the first region, which is the folding region, from being curled and improve the surface flatness. Accordingly, it is possible to reduce defects such as cracks in the folding region during folding, thereby improving the reliability of the flexible display device.

Meanwhile, referring to FIGS. 15 and 16, the second region 2A may include the region in which the sizes of the 2-1 opening region OA2-1 and the 2-2 opening region OA2-2 are different in plural.

The second region 2A may be defined as two regions according to the difference in size between the 2-1 opening region OA2-1 and the 2-2 opening region OA2-2. In detail, the second region 2A may include the 2-1 region 2-1A in which the sizes of the 2-1 opening region OA2-1 and the 2-2 opening region OA2-2 are different and the 2-2 region 2-2A in which the sizes of the 2-1 opening region OA2-1 and the 2-2 opening region OA2-2 are the same or similar.

In this case, the second region 2A may include at least two or more of the 2-1 region 2-1A in which the sizes of the 2-1 opening region OA2-1 and the 2-2 opening region OA2-2 are different.

In this case, the 2-1 region 2-1A may be included as much as about 40% to 60% of the entire region of each second region 2A disposed on the left and right sides of the first region.

When the 2-1 region 2-1A is less than about 40% of the entire region of each second region 2A, the magnitude of the stress generated in the second region is small, and thus it is not possible to effectively planarize the first region 1A, and when the 2-1 region 2-1A exceeds about 60%, the magnitude of the stress generated in the second region becomes too large, and thus adhesion failure may occur during adhesion to other panels.

The difference in size between the 2-1 opening region OA2-1 and the 2-2 opening region OA2-2 may be related to the stress generated in the second region 2A. In detail, as the sizes of the 2-1 opening region OA2-1 and the 2-2 opening region OA2-2 are different from each other, the magnitude of stress applied to the one surface 1S and the other surface 2S of the substrate 100 may be different in the second region 2A of the substrate 100.

That is, in the region in which the one surface and the other surface of the substrate 100 overlap, the stress may be generated small due to the dispersion of stress in the 2-2 opening region OA2-2 in which the size of the opening region is large, and the stress may be generated relatively large in the 2-1 opening region OA2-1 in which the size of the opening region is small.

Therefore, since the other surface 2S of the substrate on which the stress acts small tends to contract and the one surface 1S of the substrate on which the stress acts large tends to expand, the substrate may be bent in the direction of the one surface 1S of the substrate in the second region formed with different sizes of the opening regions.

Accordingly, referring to FIG. 16, in the second region 2A, the substrate 100 may be bent in the direction of the one surface 1S of the substrate in the 2-1 region 2-1A. That is, at least two or more regions in which the substrate is bent in the direction of the one surface 1S of the substrate may exist in the second region 2A.

Accordingly, since the second region 2A is bent and curled in the direction of the one surface 1S of the substrate, the first region between the second regions 2A may be naturally planarized. That is, a force being pressed against the second region 2A is generated due to a difference in stress in the second region 2A, and the first region between the second regions 2A may be naturally planarized by such a force generated in the second region.

In detail, referring to FIG. 16, the distance d between the first region 1A and the second region 2A at the minimum height may be about 0.1 mm to about 5 mm. That is, the second region 2A may be formed to be pressed against the first region 1A by about 0.1 mm to about 5 mm, and accordingly, the first region 1A may be naturally planarized by the second region 2A.

In addition, the waviness formed in the first region 1A during the rolling process is also pushed to the second region 2A, and thus the waviness of the first region 1A is reduced, thereby improving the surface flatness of the first region 1A.

Therefore, the substrate for display according to the embodiment may prevent the first region, which is the folding region, from being curled and improve the surface flatness. Accordingly, it is possible to reduce defects such as cracks in the folding region during folding, thereby improving the reliability of the flexible display device.

Hereinafter, a substrate for display according to another embodiment will be described with reference to FIGS. 17 to 23. In the description of the substrate for display according to another embodiment, the description of contents the same as or similar to those of the substrate for display according to the above-described embodiment will be omitted.

FIGS. 17 and 18 are top views of one surface and the other surface of the substrate for display according to another embodiment. That is, FIG. 17 is a top view of one surface 1S of the substrate, which is a folding inner or outer surface when the substrate 100 is folded, and FIG. 18 is a top view of the other surface 2S of the substrate, which is a folding inner or outer surface when the substrate 100 is folded.

Referring to FIGS. 17 and 18, a plurality of through-holes H1 and H2 passing through the substrate for display 100 may be formed in the substrate for display 100.

The description of shapes of the through-holes H1 and H2, a hinge portion HN, and the like are the same as those of the substrate for display according to the above-described embodiment, and thus the following description will be omitted.

Referring to FIG. 19, the first through-hole H1 and the second through-hole H2 may each include an inner region formed by passing through one surface and the other surface of the substrate. That is, the inner region may be defined as an inner region of the substrate exposed by the hole.

In detail, the first through-hole H1 may include a 1-1 inner region OA1-1 and a 1-2 inner region OA1-2. In addition, the second through-hole H2 may include a 2-1 inner region OA2-1 and a 2-2 inner region OA2-2.

The 1-1 inner region OA1-1 may be a region formed on the one surface 1S of the substrate 100 in the first through-hole H1, and the 1-2 inner region OA1-2 may be a region formed on the other surface 2S of the substrate in the first through-hole H1. That is, the 1-1 inner region OA1-1 and the 1-2 inner region OA1-2 may be defined as surface holes formed on the one surface 1S and the other surface 2S of the substrate.

In addition, the first through-hole H1 may include a first through-hole TH1. The 1-1 inner region OA1-1 may have a narrower width as it extends from the one surface of the substrate toward the other surface, and the 1-2 inner region OA1-2 may have a narrower width as it extends from the other surface of the substrate toward the one surface.

The first through-hole TH1 may be defined as a contact point between a region in which the 1-1 inner region OA1-1 has a minimum width and a region in which the 1-2 inner region OA1-2 has a minimum width.

In addition, the 2-1 inner region OA2-1 may be a region formed on the one surface 1S of the substrate in the second through-hole H2, and the 2-2 inner region OA2-2 may be a region formed on the other surface 2S of the substrate in the second through-hole H2. That is, the 2-1 inner region OA2-1 and the 2-2 inner region OA2-2 may be defined as surface holes formed on the one surface 1S and the other surface 2S of the substrate.

In addition, the second through-hole H2 may include a second through-hole TH2. The 2-1 inner region OA2-1 may have a narrower width as it extends from the one surface of the substrate toward the other surface, and the 2-2 inner region OA2-2 may have a narrower width as it extends from the other surface of the substrate toward the one surface.

The second through-hole TH2 may be defined as a contact point between a region in which the 2-1 inner region OA2-1 has a minimum width and a region in which the 2-2 inner region OA2-2 has a minimum width.

The 1-1 inner region OA1-1 may have a first width W1, the 1-2 inner region OA1-2 may have a second width W2, and the first through-hole TH1 may have a third width W3.

The first width W1 may be defined as a maximum width of the 1-1 inner region OA1-1, and the second width W2 may be defined as a maximum width of the 1-2 inner region OA1-2.

Sizes of the first width W1 and the second width W2 may be the same or similar. In addition, the size of the first width W1 may be larger than that of the third width W3. In addition, the size of the second width W2 may be larger than that of the third width W3. That is, the sizes of the first width W1 and the second width W2 may be larger than that of the third width W3.

In addition, the 2-1 inner region OA2-1 may have a first' width W1', and the 2-2 inner region OA2-2 may have a second' width W2', and the second through-hole TH2 may have a third' width W3'.

The first' width W1' may be defined as a maximum width of the 2-1 inner region OA2-1, and the second' width W2 may be defined as a maximum width of the 2-2 inner region OA2-2.

Sizes of the first' width W1' and the second' width W2' may be the same or similar. In addition, the size of the first' width W1' may be larger than that of the third' width W3'. Further, the size of the second' width W2' may be larger than that of the 3' width W3'. That is, the sizes of the first' width W1' and the second' width W2' may be larger than that of the third' width W3'.

Referring to FIGS. 20 and 21, the first width W1 and the third width W3 or the second width W2 and the third width W3 may be different as much as a size of a first distance d1+d2. In addition, the first' width W1' and the third' width W3' or the second' width W2' and the third' width W3' may be different as much as a size of a second distance d1'+d2'.

In this case, the size of the second distance d1'+d2' may be smaller than that of the first distance d1+d2. In detail, the second distance d1'+d2' may be 20 μm or less. In addition, the first distance d1+d2 may exceed 20 μm.

That is, a difference in size between the 2-1 inner region OA2-1 and the 2-2 inner region OA2-2 of the second through-hole H2 formed in the second region 2A that is the unfolding region and the second through-hole TH2 may be smaller than a difference in size between the 1-1 inner region OA1-1 and the 1-2 inner region OA1-2 of the first through-hole H1 formed in the first region 1A that is the folding region and the first through-hole TH1.

In other words, by forming the size of the first width W1' and the second width W2' of the second through-hole H2 to be smaller than the size of the first width W1 and the second width W2 of the first through-hole H1, a difference between a maximum width of the inner region and the through-hole may be reduced.

That is, by forming a curvature of an inner surface of the 2-1 inner region OA2-1 and the 2-2 inner region OA2-2 of the second through-hole H2 to be smaller than a curvature of an inner surface of the 1-1 inner region OA1-1 and the 1-2 inner region OA1-2 of the first through-hole H1, a size of a maximum width of the 2-1 inner region OA2-1 and the 2-2 inner region OA2-2 may be alleviated.

That is, In the first through-hole H1 and the second through-hole H2, a maximum width of the inner region is related to the curvature of the inner surface of the inner region, and as the curvature increases, the distance between the inner surfaces increases, and thus the width of the inner region may be increased.

Therefore, in the substrate for display according to the embodiment, by forming the curvature of the inner surface of the inner region in the second through-hole H2 of the unfolding region to be relatively smaller than the curvature of the inner region of the first through-hole H1, the maximum width of the inner region defined as the distance between the inner surfaces in the inner region may be reduced.

When the difference in size between the 2-1 inner region OA2-1 and the 2-2 inner region OA2-2 and the second through-hole TH2 is increased, and when the second through-hole TH2 is not disposed at the center of the second through-hole H2, a difference between the size of the 2-1 inner region OA2-1 and the size of the 2-2 inner region OA2-2 formed on the one surface of the substrate is increased as much as a distance deviated from the center.

Accordingly, a difference in stress acting on the one surface of the substrate and the other surface of the substrate is increased, and accordingly, a phenomenon that is curled by the difference in stress on the one surface or the other surface of the substrate, that is, the curl phenomenon may occur.

Therefore, the substrate for display according to the embodiment minimizes the difference in size between the second inner region and the second through-hole in the unfolding region, and accordingly, even though the through-hole is not positioned at the center of the hole, the difference in size between the 2-1 inner region and the 2-2 inner region may be minimized.

Accordingly, by minimizing the difference in size between the 2-1 inner region and the 2-2 inner region, the difference in stress acting on the one surface and the other surface of the substrate may also be minimized, and thus it is possible to prevent the curl phenomenon of the substrate from occurring in the unfolding region.

Hereinafter, a substrate for display according to still another embodiment will be described with reference to FIG. 22. In the description of the substrate for display according to still another embodiment, descriptions that are the same as or similar to those of the substrate for display according to the embodiment, another embodiment, and still another embodiment described above are omitted, and the same configurations are designated by the same reference numerals.

Referring to FIG. 22, the substrate for display according to still another embodiment, unlike the above-described embodiment, the size of the first distance d1+d2 may be smaller than that of the second distance d1'+d2'. In detail, the first distance d1+d2 may be 20 m or less. In addition, the second distance d1'+d2' may exceed 20 m.

That is, a difference in size between the 1-1 inner region OA1-1 and the 1-2 inner region OA1-2 1 of the first through-hole H1 formed in the first region 1A that is the folding region and the through-hole TH1 may be smaller than a difference in size between the 2-1 inner region OA2-1 and the 2-2 inner region OA2-2 of the second through-hole H2 formed in the second region 2A that is the unfolding region and the second through-hole TH2.

In other words, by forming the size of the first width W1 and the second width W2 of the first through-hole H1 to be smaller than the size of the first' width W1' and the second' width W2' of the second through-hole H2, the difference between the maximum width of the inner region and the through-hole may be reduced.

That is, by forming a curvature of an inner surface in the 1-1 inner region OA1-1 and the 1-2 inner region OA1-2 of the first through-hole H1 to be smaller than a curvature of an inner surfaces of the 2-1 inner region OA2-1 and the 2-2 inner region OA2-2 of the second through-hole H2, a size of a maximum width of the 1-1 inner region OA1-1 and the 1-2 inner region OA1-2 may be alleviated.

That is, In the first through-hole H1 and the second through-hole H2, a maximum width of the inner region is related to the curvature of the inner surface of the inner region, and as the curvature increases, the distance between the inner surfaces increases, and thus the width of the inner region may be increased.

Therefore, in the substrate for display according to the embodiment, by forming the curvature of the inner surface of the inner region in the first through-hole H1 of the folding region to be relatively smaller than the curvature of the inner region of the second through-hole H2, the maximum width of the inner region defined as the distance between the inner surfaces in the inner region may be reduced.

When the difference in size between the 1-1 inner region OA1-1 and the 1-2 inner region OA1-2 and the first through-hole TH1 is increased, and when the first through-hole TH1 is not disposed in the center of the first through-hole H1, a difference between the size of the 1-1 inner region OA1-1 and the size of the 1-2 inner region OA1-2 formed on the one surface of the substrate is increased as much as a distance deviated from the center.

Accordingly, a difference in stress acting on the one surface of the substrate and the other surface of the substrate is increased, and accordingly, a phenomenon that is curled by the difference in stress on the one surface or the other surface of the substrate, that is, the curl phenomenon may occur.

Therefore, the substrate for display according to the embodiment minimizes the difference in size between the first inner region and the first through-hole in the folding region, and accordingly, even though the through-hole is not positioned at the center of the hole, the difference in size between the 1-1 inner region and the 1-2 inner region may be minimized.

Accordingly, by minimizing a difference in size between the 1-1 inner region and the 1-2 inner region, the difference in stress acting on the one surface and the other surface of the substrate may also be minimized, and thus it is possible to prevent the curl phenomenon of the substrate from occurring in the folding region.

Hereinafter, a substrate for display according to yet another embodiment will be described with reference to FIG. 23. In the description of the substrate for display according to yet another embodiment, descriptions that are the same as or similar to those of the substrate for display according to the embodiment, another embodiment, and still another embodiment described above are omitted, and the same configurations are designated by the same reference numerals.

Referring to FIG. 23, in the substrate for display according to yet another embodiment, unlike the above-described embodiment, the sizes of the first distance d1+d2 and the second distance d1'+d2' may correspond to each other. That is, the sizes of the first distance d1+d2 and the second distance d1'+d2' may be the same as or similar to each other. In detail, the sizes of the first distance d1+d2 and the second distance d1'+d2' may be 20 μm or less.

That is, a difference in size between the 1-1 inner region OA1-1 and the 1-2 inner region OA1-2 of the first through-hole H1 formed in the first region 1A, which is a folding region and the first through-hole TH1 may correspond to a difference in size between the 2-1 inner region OA2-1 and the 2-2 inner region OA2-2 of the second through-hole H2 formed in the second region 2A, which is an unfolding region and the second through-hole TH2.

That is, by forming the curvature of the inner surfaces in the 1-1 inner region OA1-1 and the 1-2 inner region OA1-2 of the first through-hole H1 and the curvature of the inner surfaces of the 2-1 inner region OA2-1 and the 2-2 inner region OA2-2 of the second through-hole H2 so as to correspond to each other, the size of the maximum width of the 1-1 inner region OA1-1 and the 1-2 inner region OA1-2 and the size of the maximum width of the 2-1 inner region OA2-1 and the 2-2 inner region OA2-2 may be alleviated.

In the first through-hole H1 and the second through-hole H2, the maximum width of the inner region is related to the curvature of the inner surface of the inner region, and as the curvature increases, the distance between the inner surfaces increases, and thus the width of the inner region may be increased.

Therefore, in the substrate for display according to the embodiment, by forming both the curvature of the inner surface of the inner region in the first through-hole H1 of the folding region and the curvature of the inner region in the second through-hole H2 of the unfolding region to be small, the maximum width of the inner region defined as the distance between the inner surfaces in the inner region may be reduced.

When the difference in size between the 1-1 inner region OA1-1 and the 1-2 inner region OA1-2 and the first through-hole TH1 and the difference in size between the 2-1 inner region OA2-1 and the 2-2 inner region OA2-2 and the second through-hole TH2 are increased, the first through-hole TH1 is not disposed at the center of the first through-hole H1, or when the second through-hole TH2 is not disposed at the center of the second through-hole H2, the difference between the size of the 1-1 inner region OA1-1 formed on the substrate and the size of the 1-2 inner region OA1-2 and the difference between the size of the 2-1 inner region OA2-1 and the size of the 2-2 inner region OA2-2 are increased.

Accordingly, the difference in stress acting on the one surface of the substrate and the other surface of the substrate is increased, and accordingly, a phenomenon that is curled by the difference in stress on the one surface or the other surface of the substrate, that is, the curl phenomenon may occur.

Therefore, the substrate for display according to still another embodiment minimizes the difference in size between the first inner region and the first through-hole in the folding region and also minimizes the difference in size between the second inner region and the second through-hole in the unfolding region, and accordingly, even though the through-hole is not positioned at the center of the hole, the difference in size between the 1-1 inner region and the 1-2 inner region and the difference in size between the 2-1 inner region and the 2-2 inner region may be minimized.

Accordingly, by minimizing the difference in size between the 1-1 inner region and the 1-2 inner region and the difference in size between the 2-1 inner region and the 2-2 inner region, the difference in stress acting on the one surface and the other surface of the substrate may also be minimized, and thus it is possible to prevent the curl phenomenon of the substrate from occurring in the folding region and the unfolding region.

FIG. 24 is a view for describing an example in which a substrate for display according to embodiments is applied.

Referring to FIG. 24, the substrate for display according to embodiments may be applied to a flexible display device that displays a display.

For example, the substrate for display according to the embodiments may be applied to a flexible display device such as a mobile phone or a tablet.

Such a substrate for display may be applied to flexible display devices such as a mobile phone, a tablet, and the like that are flexible, bent or folded.

The substrate for display is applied to the flexible display devices such as the mobile phone, the tablet, and the like that are flexible, bent or folded and may improve the reliability of the flexible display device by improving the folding reliability in the display device that is repeatedly folded or restored.

The characteristics, structures, effects, and the like described in the above embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, the above description of the embodiments is merely examples and does not limit the present invention. It would be apparent to those of ordinary skill in the art that the present invention may be easily embodied in many different forms without changing the technical idea or essential features thereof. For example, elements of the exemplary embodiments described herein may be modified and realized. Also, it should be construed that differences related to such changes and applications are included in the scope of the present invention defined in the appended claims.

The invention claimed is:

1. A substrate for display comprising:
one surface and the other surface opposite to the one surface and foldable based on a folding axis; and
wherein the substrate is defined in a first direction corresponding to the folding axis and a second direction perpendicular to the first direction,
the substrate includes:
a first region including the folding axis; and
a second region that does not include the folding axis and is located farther from the folding axis in the second direction than the first region,
a plurality of first through-holes are formed in the first region, and a plurality of second through-holes are formed in the second region,
the second through-hole includes a 2-1 opening region in which the one surface is open and a 2-2 opening region in which the other surface is open, and
the second region includes a variable region in which a size of the 2-1 opening region and a size of the 2-2 opening region of at least one of the second through-holes are different,
the size of the 2-1 opening region is larger than the size of the 2-2 opening region, and
the size of the 2-1 opening region is not more than twice the size of the 2-2 opening region.

2. The substrate for display of claim 1, wherein the first region is disposed between the second regions, and
the variable region is 40% to 60% of the entire second region.

3. The substrate for display of claim 1, wherein the second region includes a plurality of variable regions, and
a distance between a highest height of the variable region of the second region and the first region is 0.1 mm to 5 mm.

4. The substrate for display of claim 1, wherein the size of the 2-1 opening region extends and changes in a direction of the first region in the variable region.

5. The substrate for display of claim 1, wherein a curvature of the second region is greater than a curvature of the first region.

6. The substrate for display of claim 1, wherein a surface roughness of the first region is smaller than a surface roughness of the second region.

7. The substrate for display of claim 1, wherein the first through-hole includes a 1-1 opening region in which the one surface is open and a 1-2 opening region in which the other surface is open, and
the size of the 2-2 opening region is smaller than a size of the 1-1 opening region and a size of the 1-2 opening region.

8. A flexible display device comprising;
a substrate for display;
a display panel disposed above the substrate for display; and
a touch panel disposed on the display panel,
wherein the substrate for display includes the substrate for display according to claim 1.

9. The flexible display device of claim 8, wherein the substrate for display and the display panel have different sizes.

10. The flexible display device of claim 8, wherein an area of the substrate for display is 90% or more to 110% or less of an area of the display panel.

11. A substrate for display comprising:
one surface and the other surface opposite to the one surface and foldable based on a folding axis; and
wherein the substrate is defined in a first direction corresponding to the folding axis and a second direction perpendicular to the first direction,
the substrate includes:

a first region including the folding axis; and a second region that does not include the folding axis and is located farther from the folding axis in the second direction than the first region, wherein the one surface is folded to face based on the folding axis, a plurality of first through-holes are formed in the first region, and a plurality of second through-holes are formed in the second region, the first through-hole includes a 1-1 inner region formed by opening the one surface, a 1-2 inner region formed by opening the other surface, and a first connect-hole defined as a contact point between the 1-1 inner region and the 1-2 inner region maximum widths of the 1-1 inner region and the 1-2 inner region a greater than a width of the first connect-hole, the second through-hole includes a 2-1 inner region formed by opening the one surface, a 2-2 inner region formed by opening the other surface, and a second connect-hole defined as a contact point between the 2-1 inner region and the 2-2 inner region, maximum widths of the 2-1 inner region and the 2-2 inner region are greater than a width of the second connect-hole, and a difference between the maximum width of the 1-1 inner region and the width of the first connect-hole or a difference between a maximum width of the 1-2 inner region and the width of the first connect-hole is greater than the difference between the maximum width of the 2-1 inner region and the width of the second connect-hole or the difference between the maximum width of the 2-2 inner region and the width of the second connect hole.

12. The substrate for display of claim 11, wherein a difference between the maximum width of the 2-1 inner region and a width of the second through-hole or a difference between the maximum width of the 2-2 inner region and the width of the second through-hole is 20 μm or less.

13. The substrate for display of claim 12, wherein the difference between the maximum width of the 1-1 inner region and the width of the first connect-hole or the difference between the maximum width of the 1-2 inner region and the width of the first connect-hole exceeds 20 μm.

14. The substrate for display of claim 11, wherein curvature sizes of inner surfaces of the 2-1 inner region and the 2-2 inner region are smaller than curvature sizes of inner surfaces of the 1-1 inner region and the 1-2 inner region.

* * * * *